US010365350B2

(12) United States Patent
Kamo et al.

(10) Patent No.: US 10,365,350 B2
(45) Date of Patent: Jul. 30, 2019

(54) NEURAL NETWORK-BASED RADAR SYSTEM HAVING INDEPENDENT MULTIBEAM ANTENNA

(71) Applicants: Nidec Corporation, Kyoto (JP); National University Corporation Shizuoka University, Shizuoka-shi, Shizuoka (JP)

(72) Inventors: Hiroyuki Kamo, Kawasaki (JP); Yoshihiko Kuwahara, Hamamatsu (JP)

(73) Assignees: NIDEC CORPORATION, Kyoto (JP); NATIONAL UNIVERSITY CORPORATION SHIZUOKA UNIVERSIT, Shizuoka (JP)

( * ) Notice: Subject to any disclaimer, the term of this patent is extended or adjusted under 35 U.S.C. 154(b) by 574 days.

(21) Appl. No.: 15/008,624

(22) Filed: Jan. 28, 2016

(65) Prior Publication Data

US 2016/0223651 A1   Aug. 4, 2016

(30) Foreign Application Priority Data

Jan. 29, 2015 (JP) .................................. 2015-015791

(51) Int. Cl.
*G01S 7/41* (2006.01)
*G01S 13/42* (2006.01)
(Continued)

(52) U.S. Cl.
CPC ............ *G01S 7/417* (2013.01); *G01S 13/426* (2013.01); *G01S 13/726* (2013.01);
(Continued)

(58) Field of Classification Search
CPC ...... G01S 7/417; G01S 13/426; G01S 13/726; G01S 13/391; G01S 2013/9321; G01S 2013/9346; G01S 2013/935
(Continued)

(56) References Cited

U.S. PATENT DOCUMENTS 3,368,202 A * 2/1968 Crousel ..................... G01S 1/72
342/373
5,579,010 A   11/1996 Iihoshi et al.
(Continued)

FOREIGN PATENT DOCUMENTS

JP   04-323584 A   11/1992
JP   06-308224 A   11/1994
(Continued)

OTHER PUBLICATIONS

Yamada et al., "Basic and Practice of High-Resoluation Incoming Wave Estimation Method", The Technical Committee on Antennas and Propagation of the Institute of Electronics, Information and Communication Engineers, Oct. 2, 2006, 151 pages.
(Continued)

*Primary Examiner* — Frank J McGue
(74) *Attorney, Agent, or Firm* — Keating & Bennett, LLP

(57) ABSTRACT

A radar system includes an independent multibeam antenna which outputs at least one reception signal in response to at least one arriving wave, and a signal processing circuit in which a learned neural network has been established. The signal processing circuit receives the at least one reception signal, inputs the at least one reception signal or a secondary signal generated from the at least one reception signal to the neural network, performs computation by using the at least one reception signal or secondary signal and learned data of the neural network, and outputs a signal indicating the number of at least one arriving wave from the neural network.

27 Claims, 19 Drawing Sheets

(51) Int. Cl.
  *G01S 13/72* (2006.01)
  *G01S 13/93* (2006.01)

(52) U.S. Cl.
  CPC ....... *G01S 13/931* (2013.01); *G01S 2013/935* (2013.01); *G01S 2013/9321* (2013.01); *G01S 2013/9346* (2013.01)

(58) Field of Classification Search
  USPC .......................................................... 342/70
  See application file for complete search history.

(56) References Cited

U.S. PATENT DOCUMENTS

| | | | |
|---|---|---|---|
| 5,768,477 A | 6/1998 | Johnson et al. | |
| 6,366,236 B1 | 4/2002 | Farmer et al. | |
| 8,820,782 B2 * | 9/2014 | Breed | B60J 10/00 280/735 |
| 8,902,103 B2 * | 12/2014 | Kim | G01S 13/345 342/118 |
| 8,982,669 B2 * | 3/2015 | Barthel | G01S 7/412 367/99 |
| 9,151,692 B2 * | 10/2015 | Breed | B60C 11/24 |
| 2006/0007036 A1 | 1/2006 | Natsume et al. | |
| 2006/0238405 A1 * | 10/2006 | Wakayama | G01S 13/426 342/79 |
| 2011/0181300 A1 * | 7/2011 | Bowring | G01S 7/411 324/637 |
| 2012/0268314 A1 | 10/2012 | Kuwahara et al. | |
| 2014/0225763 A1 * | 8/2014 | Kavaler | G08G 1/142 342/70 |
| 2014/0297172 A1 | 10/2014 | Huelsen | |

FOREIGN PATENT DOCUMENTS

| | | |
|---|---|---|
| JP | 07-318635 A | 12/1995 |
| JP | 10-260238 A | 9/1998 |
| JP | 2003-507716 A | 2/2003 |
| JP | 2003-139849 A | 5/2003 |
| JP | 2004-108851 A | 4/2004 |
| JP | 2005-181168 A | 7/2005 |
| JP | 2005-295201 A | 10/2005 |
| JP | 2006-047282 A | 2/2006 |
| JP | 2006-091029 A | 4/2006 |
| JP | 2006-234683 A | 9/2006 |
| JP | 2006-275840 A | 10/2006 |
| JP | 2009-156582 A | 7/2009 |
| JP | 2011-149697 A | 8/2011 |
| JP | 2012-168157 A | 9/2012 |
| JP | 2013-044602 A | 3/2013 |
| JP | 2014-119348 A | 6/2014 |

OTHER PUBLICATIONS

Official Communication issued in Japanese Patent Application No. 2015-015791, dated Oct. 16, 2018.
Takumi, M. et al.; "Experiments on DOA Estimation Using RBF Neural Network"; Graduate School of Science and Technologies, Shizuoka University; Oct. 16, 2005; 3 pages.

* cited by examiner $T_1 = \begin{pmatrix} 1 \\ 1 \end{pmatrix}$ $T_1 = \begin{pmatrix} 1 \\ 0 \end{pmatrix}$ $T_1 = \begin{pmatrix} 0 \\ 1 \end{pmatrix}$ $T_2 = \begin{pmatrix} 1 \\ 1 \end{pmatrix}$ $T_2 = \begin{pmatrix} 1 \\ 0 \end{pmatrix}$ $T_2 = \begin{pmatrix} 0 \\ 1 \end{pmatrix}$

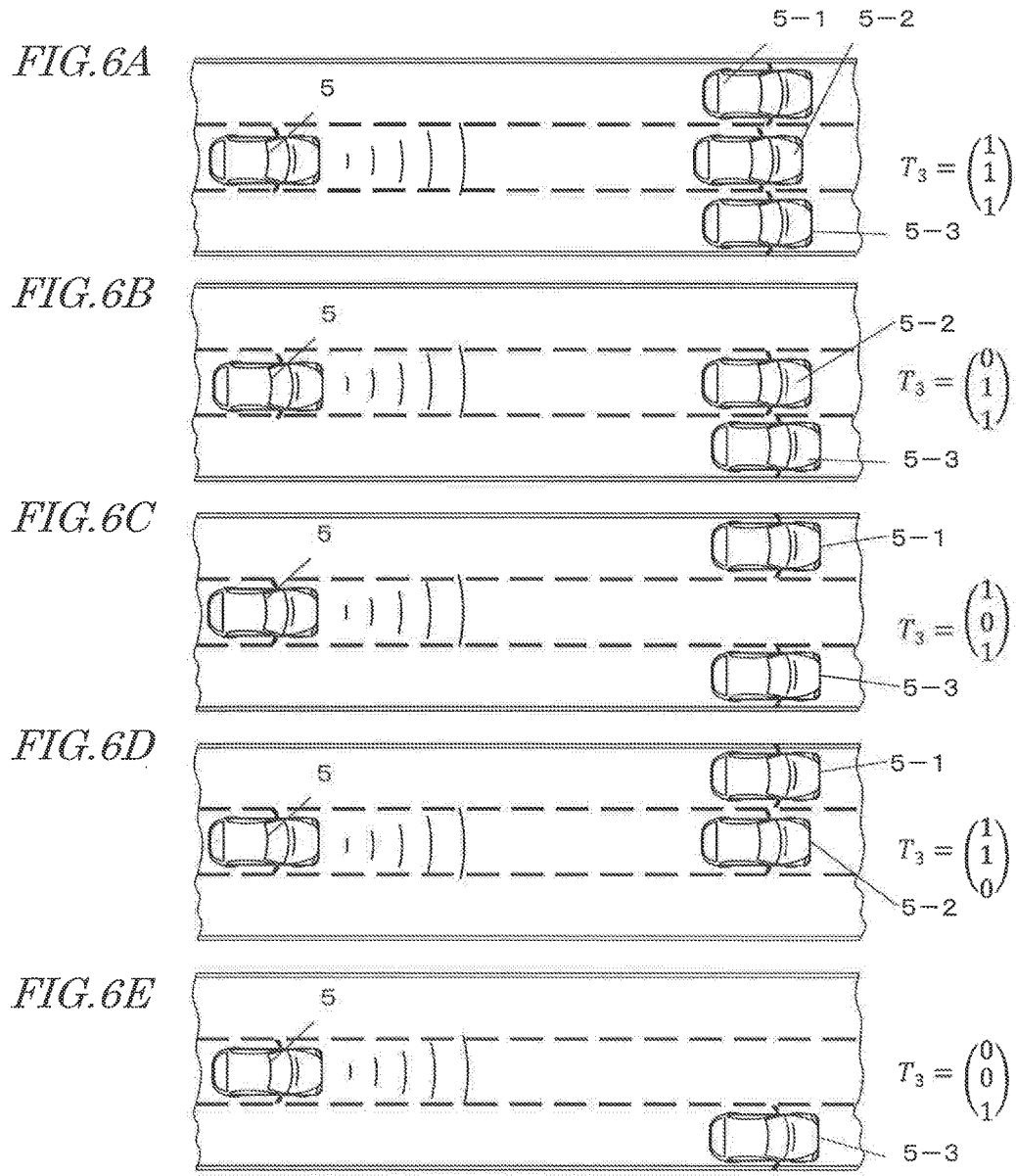

NEURAL NETWORK-BASED RADAR SYSTEM HAVING INDEPENDENT MULTIBEAM ANTENNA

BACKGROUND

1. Technical Field

The present disclosure relates to a technique of estimating the number (one or more) of preceding vehicles and azimuths thereof by using a radar.

2. Description of the Related Art

Conventionally, onboard radar systems have utilized radars of various electronic scanning types which are based on the methods including FMCW (Frequency Modulated Continuous Wave) radar, multiple frequency CW (Continuous Wave) radar, and pulse radar, for example. In such radar systems, generally speaking, a modulated continuous wave, or alternatively a pulse wave, is emitted from a transmission antenna as a "transmission wave", and an arriving wave that is reflected from a preceding vehicle and returns to the reception antenna is received as a "reception wave". Then, from an antenna signal (reception signal) that is based on the reception wave, the position and velocity of the preceding vehicle are estimated. With reference to the vehicle having the radar system mounted thereon, the position of a preceding vehicle is defined by a distance ("range") between the vehicle having the radar system mounted thereon and the preceding vehicle, and the direction of the preceding vehicle. In the present specification, the vehicle having the radar system mounted thereon is referred to as "the driver's vehicle", whereas any vehicle traveling before or ahead of the driver's vehicle is referred to as a "preceding vehicle". It is assumed that a "preceding vehicle" may be traveling in the same lane as the driver's vehicle, or in an adjoining lane containing traffic traveling in the same direction as the driver's vehicle.

In an onboard radar system, the "direction" of a preceding vehicle can be defined by an azimuth within an approximate plane containing the road. Therefore, in the present specification, for a given object that is detected by a radar, the terms "direction" and "azimuth" may be synonymously used.

The direction of a preceding vehicle can be expressed by an angle of the direction of arrival (DOA: Direction Of Arrival)" of an arriving wave. In the field of radar technology, an object that reflects a transmission wave, such as a preceding vehicle, may be referred to as a "target". The target functions as a wave source of the "reflected wave". The target is a signal source of a wave that arrives at the reception antenna, i.e., a reception wave.

In a radar system for onboard use, a small-sized and inexpensive antenna is desirable. For example, an array antenna composed of four or five antenna elements is used as a receiving antenna. Depending on the manner in which the antenna elements are arrayed, an array antenna can be categorized into a linear array type, a planar array type, a circular array type, or a conformal array type.

Based on the reception signals which are obtained from the respective antenna elements in the array antenna, it is possible through a signal processing technique to estimate the azimuth (direction of arrival) of an object that reflects the transmission wave. However, in the case where plural objects exist to reflect a transmission wave, the wave reflected off each object will impinge on the reception antenna at a different angle. Therefore, the reception antenna will provide a complicated signal in which a plurality of arriving waves are superposed. Moreover, in an onboard radar system, the relative positioning and distance of an object, as taken with respect to the reception antenna, change dynamically. Therefore, in order to accurately estimate the respective azimuth(s) of one or plural preceding vehicles based on the reception signals at the reception antenna, a huge amount of computation needs to be rapidly done by a computer.

In order to estimate the direction of arrival, various algorithms for processing the reception signals at an array antenna have been proposed. Known algorithms for direction-of-arrival estimation include the following methods (see Japanese Laid-Open Patent Publication No. 2009-156582 and Japanese Laid-Open Patent Publication No. 2006-275840).

(1) Digital Beam Former (DBF) method
(2) Capon method
(3) linear prediction coding method
(4) minimum norm method
(5) MUSIC (MUltiple SIgnal Classification) method
(6) ESPRIT (Estimation of Signal Parameters via Rotational Invariance Techniques)) method Generally speaking, as the angular resolution of direction estimation increases, an increased amount of computation becomes needed for signal processing. In the aforementioned methods of direction-of-arrival estimation (1) to (6), angular resolution increases in the order from method (1) to method (6), thus requiring so much more computational processing. The MUSIC method and the ESPRIT method, which provide particularly high angular resolutions and are also called "super-resolution algorithms", require rapidly subjecting the reception signals at the array antenna to processes that require large computation amounts. Specifically, under a super-resolution algorithm, a spatial covariance matrix is generated from the data of respective reception signals at the array antenna. Then, through eigenvalue decomposition of this spatial covariance matrix, the direction of arrival of the reception wave is estimated. Eigenvalue decomposition of a matrix involves decomposing the matrix into a diagonal matrix having eigenvalues as its diagonal components. When a spatial covariance matrix is subjected to eigenvalue decomposition, eigenvalues and eigenvectors of the spatial covariance matrix are obtained (see, for example, Japanese Laid-Open Patent Publication No. 2006-047282).

The estimation accuracy of a direction of arrival improves as more noise components are removed from the spatial covariance matrix. Since it can be assumed from ergodicity that an ensemble average equals a time average, a spatial covariance matrix is generated by using a time average of received data. For example, in the case of an FMCW radar, it is preferable to maximize the number of samples, i.e., number of snapshots, for the data set of beat signals (that is, chronological data within a certain time slot which can be converted into frequency domain data), thus to utilize an averaged-out spatial covariance matrix. Thus, in order to enhance the accuracy of estimation of a direction of arrival in a situation where the position of a preceding vehicle may always be changing, rapid sampling needs to be performed, thus requiring greater memory capacity for the sampled data.

Apart from the aforementioned methods utilizing an array antenna (array antenna methods), methods are also available for onboard radar systems which create a plurality of independent electromagnetic wave beams (these methods being referred to as "independent multibeam antenna methods").

Typically, the plurality of antenna elements of the aforementioned array antenna have the same directivity. Moreover, reception signals which are obtained from the respective antenna elements are correlated with one another. The aforementioned variety of algorithms for direction-of-arrival estimation all rely on the fact that there exists correlation between plural reception signals which are respectively generated by the arrayed plurality of antenna elements.

On the other hand, in an independent multibeam antenna method, a multibeam antenna is used which creates plural electromagnetic wave beams (hereinafter simply referred to as "electromagnetic waves" or "beams") simultaneously, or at short time intervals effectively equivalent to being simultaneous, with a lens or a reflector having a plurality of focal points. The lens or reflector causes an electromagnetic wave which arrives at the multibeam antenna from a certain azimuth to be converged at a corresponding one of the plurality of focal points. Which focal point an electromagnetic wave will be converged at depends on the direction of the electromagnetic wave arriving at the multibeam antenna. A plurality of antenna elements are disposed respectively at these plurality of focal points. Such antenna elements are also referred to as "beam elements".

If there were no lens or reflector, the electromagnetic wave, which approximates a plane wave, would impinge on all of the plurality of antenna elements, each antenna element generating a reception signal. The would be phase differences among the reception signals thus generated, the phase differences being dependent on the spatial distribution of the antenna elements and the incident angle of the electromagnetic wave.

On the other hand, when an electromagnetic wave is converged by a lens or a reflector, the electromagnetic wave after being converged will impinge on some, typically only one, of the plurality of antenna elements. Which antenna element it will impinge on is dependent on the incident angle of the electromagnetic wave (beam direction).

With such an independent multibeam antenna method, each beam is created by utilizing the entirety of the "antenna aperture area", which corresponds to the expanse of the region where the plurality of antenna elements are arrayed. Therefore, the independent multibeam antenna method provides a higher gain than does the array antenna method. Moreover, in the independent multibeam antenna method, a transmission wave in itself will be shaped into a beam having high directivity, whereby an effect of suppressing the influence of multipath propagation is expected.

As compared to the array antenna method, the independent multibeam antenna method enjoys less continuity of phase information between input signals which are obtained simultaneously, or at short time intervals effectively equivalent to being simultaneous from the respective antenna elements. In other words, there is lower correlation between reception signals. Therefore, in any conventional independent multibeam antenna method, only limited techniques of arriving wave estimation have been applied, such as the amplitude monopulse method or the gravity calculation level response method.

SUMMARY OF THE INVENTION

An embodiment of the present disclosure provides a radar system technique compatible with those algorithms for direction-of-arrival estimation which have conventionally been considered inapplicable to the independent multibeam antenna method, whereby the azimuth of a target is able to be estimated with an improved resolution.

An illustrative radar system according to the present disclosure comprises: an independent multibeam antenna which outputs at least one reception signal in response to at least one arriving wave; and a signal processing circuit in which a learned neural network has been established; wherein the signal processing circuit: receives the at least one reception signal; inputs the at least one reception signal or a secondary signal generated from the at least one reception signal, to the neural network; performs computation by using the at least one reception signal or secondary signal, and data of the learned neural network; and output a signal indicating a number of the at least one arriving wave from the neural network.

With an illustrative radar system according to a preferred embodiment of the present invention, by adopting an independent multibeam antenna method, a reception signal(s) or a secondary signal generated from the reception signal(s) is able to be input to a learned neural network to obtain a signal indicating the number of arriving waves. The amount of computational processing needed for the computation by a neural network is so much less than the computational processing needed by a super-resolution algorithm such as MUSIC, and also the opportunity to adequately performing learning of a neural network in advance enhances the accuracy of determination of the number of arriving waves.

In one exemplary preferred embodiment of the present invention, the aforementioned number of arriving waves is acquired as information indicating a spatial distribution of preceding vehicles.

These general and specific aspects may be implemented using a system, a method, and a computer program stored on a computer readable medium, and any combination of systems, methods, and computer programs stored on a computer readable medium.

Additional benefits and advantages of the disclosed preferred embodiments of the present invention will be apparent from the specification and Figures.

The benefits and/or advantages may be individually provided by the various preferred embodiments and features of the specification and drawings disclosure, and need not all be provided in order to obtain one or more of the same.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 6A, 6B, 6C, 6D and 6E are diagrams each showing a situation of travel concerning a preceding vehicle (5-1), (5-2) and/or (5-3) when the driver's vehicle 5 is traveling in the center lane among three lanes, as well as a training signal $T_3$.

DETAILED DESCRIPTION

Terminology

Figure 1:
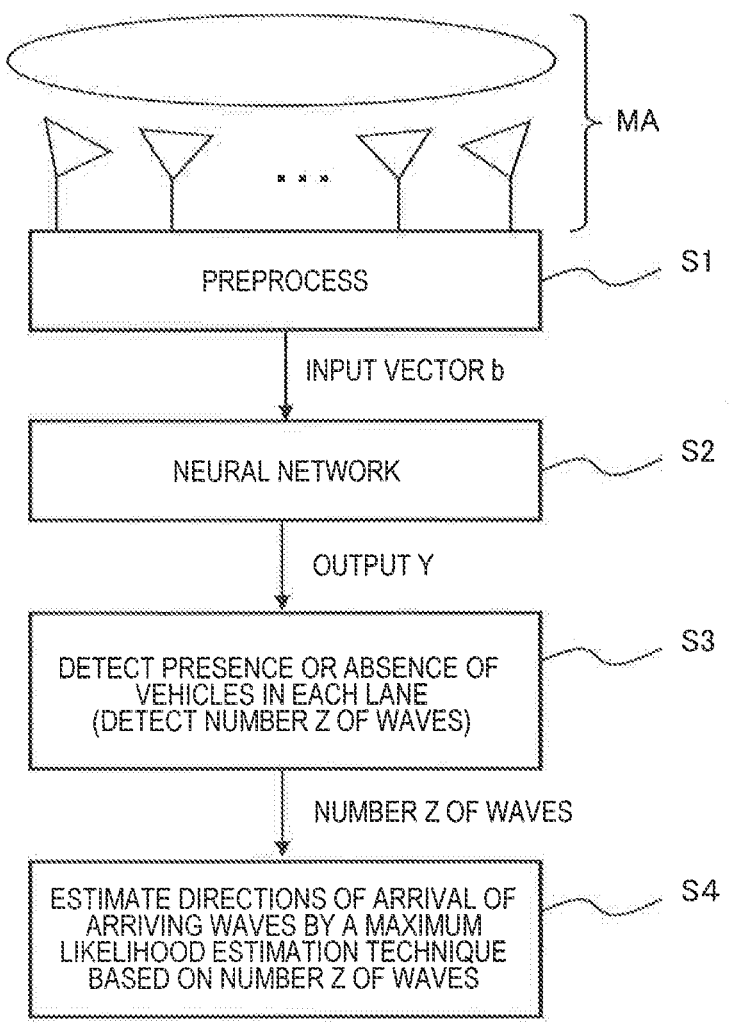
FIG. 1 is a flowchart showing the procedure of a vehicle identification process according to a preferred embodiment of the present invention.

Generally, an "independent multibeam antenna" is an antenna which is capable of transmitting and receiving a plurality of independent beams in mutually different directions.

A typical example of an independent multibeam antenna includes a lens or a reflector having a plurality of focal points, and a plurality of antenna elements (a plurality of beam elements) respectively disposed at the plurality of focal points. The independent multibeam antenna of this example is able to simultaneously emit plural beams in mutually different directions, or consecutively emit one or plural beams in different directions within a "sufficiently short time" comparable to being "simultaneous".

Herein, a "sufficiently short time" comparable to being "simultaneous" means a length of time which is so short that any change in "the relative position of a target with respect to the antenna", which may vary over time, is ignorable. A "sufficiently short time" comparable to being "simultaneous" can be defined based on the resolution (distance resolution and/or azimuth resolution) of a radar system in which the independent multibeam antenna is incorporated. If an amount of movement that a target makes is within the distance resolution and/or azimuth resolution of the radar, then the amount of time required for that movement is a "sufficiently short time".

For example, in a radar system utilizing the 76 GHz band, 25 milliseconds or less may well be a "sufficiently short time" for the following reasons. A 76 GHz radar system has a distance resolution of about 0.7 m. Assume that the largest possible relative velocity between the driver's vehicle and a target (i.e., another vehicle) is expected to be 100 km/h (or about 27.8 m/s). Then, the moving time corresponding to this distance resolution is about 25 milliseconds. Similarly, assume that the radar system has an azimuth resolution of 1 degree. The amount of time which is required by a vehicle traversing 40 m ahead at 100 km/h to move by 1 degree while keeping a constant distance is also 25 milliseconds. Therefore, in a radar system which utilizes the 76 GHz band, 25 milliseconds or less can be regarded as a "sufficiently short time".

A second example of an independent multibeam antenna includes one or plural antenna elements and a mechanism to mechanically switch the position and/or the directivity direction of at least one antenna element. By mechanically switching the directivity direction of each beam within a sufficiently short time comparable to being simultaneous, the independent multibeam antenna of this example is able to consecutively create plural beams in mutually different directions.

A third example of an independent multibeam antenna includes a plurality of partial array antennas. By changing the direction of beam emission from partial array antenna to partial array antenna, it is possible to simultaneously emit plural beams in different directions, or consecutively emit one or plural beams in different directions within a sufficiently short time comparable to being simultaneous. Each partial array antenna includes several antenna elements which are in an array, and utilizes these several antenna elements to emit a beam in a certain direction. Each antenna element may be a constituent element belonging to only one partial array antenna, or a constituent element belonging to two or more partial array antennas. Each "partial array antenna" corresponds to a "beam element" mentioned above.

A fourth example of an independent multibeam antenna includes a plurality of antenna elements and a digital phase shifter provided corresponding to each antenna element. By controlling the feeding phase with each digital phase shifter, it is possible to create a beam having any arbitrary directivity. Each digital phase shifter is arranged so that the phase of the electromagnetic wave to be transmitted is changed by a phase shift amount that corresponds to a predetermined phase shift control voltage.

The independent multibeam antenna of this example controls the feeding phase in a discrete manner (stepwise) with the digital phase shifters. Thus, within a given angle range, the angle of transmission and the angle of reception of a beam is allowed to vary consecutively, by an angle (minimum step angle) that is adapted to that step. This allows the angle range to be scanned with the electromagnetic wave. The digital phase shifters can be implemented by microwave signal processors, which are GaAs MMICs (Monolithic Microwave Integrated Circuits), for example.

As described above, an independent multibeam antenna may have a function of emitting a plurality of independent beams in mutually different directions. It is also assumed in the following description that an "independent multibeam antenna" has both functions of reception and transmission.

Performing both of beam transmission and reception with the use of an independent multibeam antenna is useful in an environment where reflections over multiple times (multipath propagation) may occur, e.g., in a tunnel. The reason is the ability to limit beam transmission and reception to only specific directions based on higher independence between beams.

However, an illustrative embodiment of the present invention may at least have a function of receiving a plurality of independent beams in mutually different directions, without having a function of emitting a plurality of beams. For example, an antenna to emit an electromagnetic wave with low directivity, i.e., a beam of broad directivity, may be separately provided, and this antenna may be allowed to emit a beam while the independent multibeam antenna acts to receive plural beams including reflected waves of that beam. In that case, the independent multibeam antenna may only have the function of receiving beams, thus exhibiting directivity with respect to beam reception.

An antenna(s) for beam transmission and the independent multibeam antenna may both be provided, and the antenna to transmit beams may be switched according to the environment. For example, in a tunnel or the like where multipath propagation is likely to occur, the independent multibeam antenna may be employed for beam transmission and reception. On the other hand, in environments other than tunnels or the like, where multipath propagation is unlikely to occur, the antenna(s) for beam transmission may be employed for beam transmission.

In an independent multibeam antenna, in principle, the reception signal of each of the plurality of beam elements is distinct on the basis of beam direction. More specifically, the reception signal of a beam arriving from a given azimuth angle is independent of the reception signal of any other beam arriving from an azimuth angle which is different by a predetermined magnitude or more, with no substantial correlation existing between these reception signals. As used herein, there being "no correlation" means absence of correlation, even with respect to sensitivity regarding plural side lobes.

On the other hand, between two adjacent beam elements, for example, correlation may exist between the reception signals of a beam arriving from a given azimuth angle. The reason is that, when sensitivity at the side lobes is taken into consideration, two adjacent beam elements are able to simultaneously detect that beam.

Any method that uses an "independent multibeam antenna", which might generally be referred to as a "multibeam antenna method" in the field of art, will be expressed in the present application as an "independent multibeam antenna method".

A "vehicle" is any vehicle able to travel on roads or other surfaces, the vehicle including an engine and/or an electric motor to generate driving force for traveling. A vehicle encompasses a 4-wheeled automobile, a 3-wheeled automobile, and a motorcycle, for example. A part or a whole of a vehicle's travel may take place under automatic control, or even be an unmanned travel.

A "reception signal" is an output signal (either analog or digital) from an antenna element.

A "secondary signal" is a signal which is obtained by processing a reception signal. Examples of the secondary signal include a beat signal, a signal containing non-diagonal components of a spatial covariance matrix, and an analytic signal. As used herein, an "analytic signal" is a complex signal which is expressed as a sum of a reception signal (real-number component) and an orthogonal signal (imaginary-number component) of the reception signal. An orthogonal signal of a reception signal can be generated from the reception signal by Hilbert transform, for example.

"Learned data" includes weight values to be applied to inputs to the nodes of a neural network.

An "arriving wave" is an electromagnetic wave which arrives to an antenna from a target (a wave source or a signal source). When the antenna is mounted on the front surface of the driver's vehicle, a typical example of a target serving as a wave source of an arriving wave is a preceding vehicle. When the antenna is mounted on the rear surface of the driver's vehicle, a typical example of a target is a following vehicle.

The inventors of preferred embodiments of the present invention have made discoveries described below.

In safety technology of automobiles, e.g., collision avoidance systems or automated driving, it is particularly essential to identify a plurality of vehicles (targets) that are traveling side by side ("abreast of each other") in positions at an identical distance from the driver's vehicle. In the present specification, an "identical distance" not only means exactly the same distance, but also includes differences equal to or smaller than the resolution of a given radar system in terms of distance. In this context, it has been believed that identifying the preceding vehicles essentially requires estimating the direction of arriving waves therefrom.

When applying a technique of arriving wave direction estimation to a radar system for onboard use, more rapid response is preferred because, on the road, the position and velocity of the driver's vehicle and the position and velocity of a preceding vehicle will undergo incessant changes, which need to be obtained and understood accurately and rapidly. Moreover, in order to achieve avoidance of vehicle collision, reduction of collision damage, lane-keeping assist, there is an arising need to acquire ambient information by using image sensors or other radars, and perform various signal processing. It will not be practical to incorporate a processor with an excessively high processing ability to achieve such various signal processing. Moreover, even if a high-performance processor were adopted, there would be no guarantee of a sufficiently rapid response. Thus, various attempts are being made in order to reduce the computational processing amount in algorithms for direction-of-arrival estimation.

In conventional array antenna methods which are widely used in onboard radar systems, it is easy to adjust the antenna characteristics through changing the interval between antenna elements and array weights, thus resulting in profuse choices of available methods of direction-of-arrival estimation. However, the antenna aperture area that is generally expectable in an onboard array antenna only provides for a small gain. Moreover, an array antenna method has a broad directivity as necessitated by the required viewing angle, thus being susceptible to multipath propagation and ghosting of the target.

On the other hand, an independent multibeam antenna method provides a large gain and is less susceptible to multipath propagation. However, correlation between output signals from the antenna(s) is lower in independent multibeam antenna methods than in conventional array antenna methods. Therefore, high resolution algorithms that utilize a spatial covariance matrix have not been used; instead, what has been used is relatively low-resolution algorithms for direction-of-arrival estimation, e.g., the amplitude monopulse method.

In order to solve such problems, Japanese Laid-Open Patent Publication No. 2005-295201 discloses applying a spatial Fourier transform to independent multibeam reception signals to generate imaginary array antenna signals; by applying the MUSIC method to the imaginary array antenna signals, a direction-of-arrival estimation as used in array antenna methods would become possible. However, generation of imaginary array antenna signals requires a huge amount of calculation.

One embodiment of the radar system according to the present disclosure enables direction-of-arrival estimation for arriving waves in a radar system of an independent multibeam antenna method, with less calculational load.

Hereinafter, prior to describing the preferred embodiments of the present invention, fundamental principles behind the discoveries made by the inventors of preferred embodiments of the present invention will be described.

The inventors have arrived at the finding that it is difficult to extract sufficiently meaningful signals even by applying a spatial averaging process to signals from the respective antenna elements obtained under an independent multibeam antenna method. The presumable reason is that the antenna elements do not match in phase response. Stated otherwise, in conventional independent multibeam antenna methods, it has presumably been difficult to distinguish between the highly coherent arriving waves within any beams that are substantially simultaneously received.

The inventors have found through further study that, even when highly coherent arriving waves are received by using an independent multibeam antenna method, their azimuths-of-arrival can be estimated by using a maximum likelihood estimation technique such as the SAGE method, for example.

In order to adopt a maximum likelihood estimation technique, because of its calculation principles, the number of arriving wave needs to be known as advance information. Under conventional array antenna methods, the number of arriving waves would have been obtained through eigenvalue decomposition of a spatial covariance matrix based on the reception signals. As for independent multibeam antenna methods, a further method of azimuth-of-arrival estimation has been desired that is available in obtaining the information of the number of arriving waves.

The inventors have arrived at the concept of utilizing a neural network to estimate the number of arriving waves in adopting a maximum likelihood estimation technique. Since combinations between patterns of reception signals arriving at the respective antenna elements and directions of the arriving waves are learned, presence or absence of correlation between arriving waves is no longer an issue. Moreover, a neural network which has previously completed learning will require far less computational processing than the computational processing amount for eigenvalue decomposition of a spatial covariance matrix, for example, thus resulting in a very small computational load. In the alternative, it would also be possible to combine a neural network and the computation of eigenvalue decomposition of a spatial covariance matrix to obtain an enhanced accuracy of number-of-waves estimation, although resulting in a relatively large computational processing amount.

In the present specification, reception signals obtained with a multibeam radar and a neural network which has previously completed learning are utilized to generate a signal representing the number of arriving waves, and this estimated number of arrive waves is supplied for use in a maximum likelihood estimation technique. This enables a high resolution algorithm for direction-of-arrival estimation which does not require generation of imaginary array antenna signals.

The present specification will describe a learning process by a neural network, and also a process of identifying the number of preceding vehicles and their spatial distribution through use of a learned neural network. Once a learning process is performed, subsequent processes of identification are enabled. In a radar system for onboard use according to a preferred embodiment of the present invention, typically, a learning process may be performed before mounting of the radar system, and an identification process may be performed during driving by a driver, this identification process being performed by a signal processing circuit such as a processor, microprocessor, Central Processing Unit (CPU), etc., which is mounted in the vehicle.

One advantage of utilizing a neural network is being able to significantly reduce the calculation and computational processing resources needed for the identification process, as compared to any process which uses a high resolution algorithm to estimate the directions of arrival of the arriving waves and to detect the number of preceding vehicles and their spatial distribution. Hereinafter, the preceding vehicle identification process utilizing a neural network will be first described with reference to FIG. 1, and thereafter, the particulars of the learning process will be described while also explaining the respective steps in the identification process.

FIG. 1 shows procedure of a vehicle identification process according to a preferred embodiment of the present invention. Each process step in FIG. 1 is executed by a signal processing circuit including in a processor, microprocessor, CPU, etc.

First, at step S1, the signal processing circuit applies preprocessing to reception signals which are acquired by an independent multibeam antenna MA including M antenna elements (where M is an integer of 3 or more; the same will also be true hereinbelow) to generate an input vector b. The details of the input vector b will be described later.

At step S2, the signal processing circuit inputs the input vector b to a learned neural network.

At step S3, the signal processing circuit determines whether a vehicle exists or not in each lane, based on an output Y of the neural network. The presence or absence of vehicles can be redefined as the number of wave sources that are conducive to arriving waves, i.e., the number Z of waves. The signal processing circuit utilizes the output Y of the neural network to detect the number Z of waves, and outputs it.

At step S4, the signal processing circuit uses information of the number Z of waves in applying a maximum likelihood estimation technique, and estimates the directions of arrival of the arriving waves.

Hereinafter, steps S1 to S4 will each be described.

At step S1, the signal processing circuit generates a beat signal by using each reception signal acquired by the independent multibeam antenna MA with M antenna elements and each corresponding transmission signal. These beat signals are input to the neural network at the next step S2 in the form of a vector b.

The signals received by the independent multibeam antenna MA can be expressed as a "vector" having M elements, by Equation 1 below.

$$S = [s_1, s_2, \ldots, s_M]^T \quad \text{Equation 1}$$

In the above, $s_m$ (where m is an integer from 1 to M; the same will also be true hereinbelow) is the value of a signal which is received by an $m^{th}$ antenna element. The superscript T means transposition. S is a column vector.

It is assumed that the aforementioned reception signals are reflected waves originating from transmission signals Y as expressed by Equation 2 below.

$$Y = [y_1, y_2, \ldots, y_M]^T \qquad \text{Equation 2}$$

Note that $y_m$ (m: an integer from 1 to M; the same will also be true hereinbelow) is a transmission signal corresponding to a reception signal $s_m$. However, each reception signal may contain a noise component.

The signal processing circuit generates a vector $b_0$ at least based on the aforementioned reception signals S. For example, the vector $b_0$ may straightforwardly be the reception signals expressed by Equation 1. In this case, Equation 3 below holds true.

$$b_0 = S \qquad \text{Equation 3}$$

Alternatively, the vector $b_0$ may be beat signals which are obtained based on the aforementioned reception signals S and transmission signals Y. The details of an example of using beat signals will be described later with reference to FIG. 10 to FIG. 13.

The signal processing circuit converts (i.e., normalize) the vector b0 into a unit vector, thus deriving a vector b to be input to the neural network.

$$b = \frac{b_0}{\|b_0\|} \qquad \text{Equation 4}$$

The denominator ($\|b_0\|$) on the right-hand side represents the norm of the vector b0.

The reason for conducting normalization as indicated by Equation 4 is to prevent excessive input to the neural network; however, normalization is not essential. In the present specification, the aforementioned vector $b_0$ and/or b may be referred to as a secondary signal that is generated from reception signals.

Next, the neural network to be used at step S2 in FIG. 1 will be described in detail.

Figure 2:
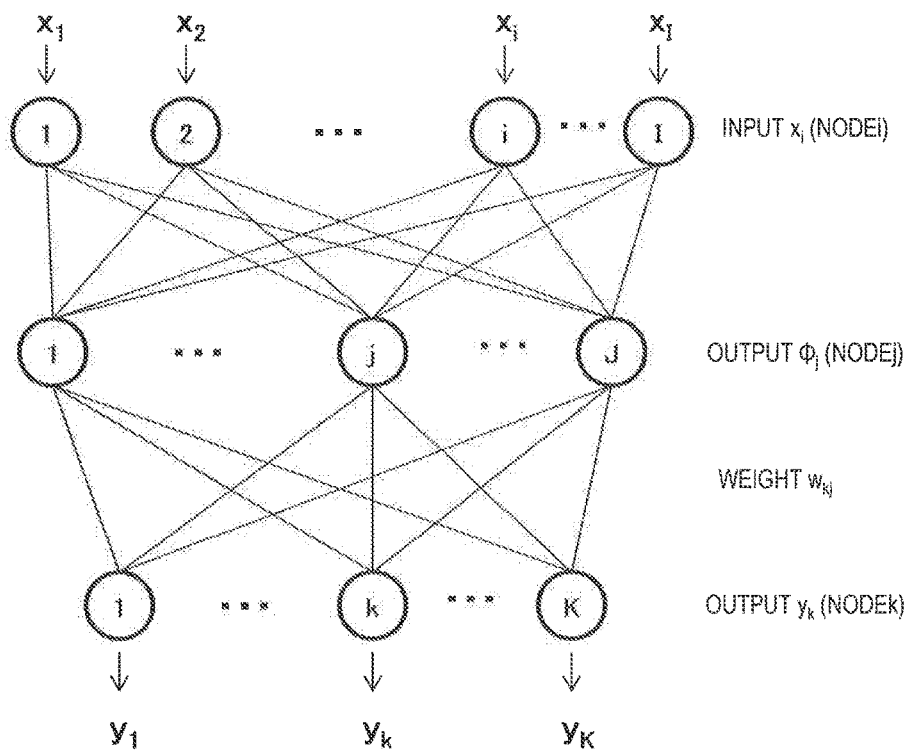
FIG. 2 is a diagram showing the structural model of a generic hierarchical neural network.

FIG. 2 shows a structural model of a generic hierarchical neural network. Although the present specification will illustrate an RBF (radial basis function) neural network, which is a kind of hierarchical neural network, any other hierarchical neural network or non-hierarchical neural network may instead be used.

As shown in FIG. 2, the RBF neural network includes an input layer $x_i$ of nodes 1 to I to accept input signals $x_i$ (where i is an integer from 1 to I), a hidden layer $\varphi_j$ of nodes 1 to J (where j is an integer from 1 to J), and an output layer $y_k$ of nodes 1 to K (where k is an integer from 1 to K).

The output $y_k(x)$ of the RBF network is expressed by Equation 5 below.

$$y_k(x) = \sum_{j=1}^{J} w_{kj} \phi_j(x - c_j) \qquad \text{Equation 5}$$

In Equation 5, J is the number of neurons in the hidden layer; $w_{kj}$ is a weight between a $j^{th}$ neuron in the hidden layer and a $k^{th}$ neuron in the output layer; $c_j$ is a central vector of the $j^{th}$ neuron in the hidden layer; and x is the input vector. Moreover, $\varphi_j$ is a Gaussian kernel function as indicated by Equation 6 below.

$$\phi_j(x - c_j) = \exp\left\{-\frac{(x - c_j)^T(x - c_j)}{2\sigma_j^2}\right\} \qquad \text{Equation 6}$$

In Equation 6, $\sigma_j$ is a parameter representing the width of the central vector of the $j^{th}$ neuron in the hidden layer.

Figure 3:
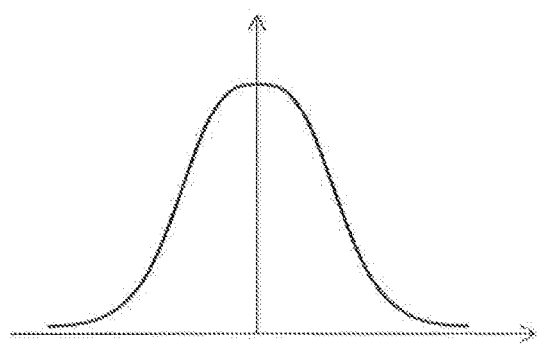
FIG. 3 is a diagram schematically showing the waveform of an illustrative Gaussian kernel function.

FIG. 3 schematically shows the waveform of the Gaussian kernel function indicated by Equation 6. The horizontal axis represents input, and the vertical axis represents output. As will be understood from FIG. 3, each neuron in the hidden layer exhibits a large response only when the input vector is close to the central vector in the RBF. In other words, each neuron in the hidden layer responds only to a specific input.

The RBF neural network is able to learn a relationship between a pattern which is fed to the input layer $x_i$ and a pattern to be output from the output layer $y_k$ (which should ideally be the training signal).

The inventors have envisaged an implementation where an RBF neural network is utilized in recognizing the number of preceding vehicles (one or more) traveling ahead of the driver's vehicle, and their spatial distribution, by using a radar system.

During learning of the RBF neural network, the pattern that is fed to the input layer $x_i$ of the RBF neural network is the vector b expressed by Equation 4, which is obtained from the reception signal X. On the other hand, the training signal that is fed is a signal (in vector expression) specifying the number of preceding vehicles (one or more) and their spatial distribution as existing when that vector b was obtained. This mapping will be repeatedly learned to a point where a signal which is output in response to any given pattern that is fed to the input layer $x_i$ will be a signal reflecting the learning results, i.e., one that accurately identifies the number of preceding vehicles (one or more) and their spatial distribution.

Hereinafter, the learning method by the RBF neural network will be specifically described.

The inventors have envisaged the following example situations of travel concerning the driver's vehicle in which the radar system according to various preferred embodiments of the present invention is mounted.

(A) Between two adjoining lanes (first and second lanes) of the same direction, the driver's vehicle is traveling in the first lane.

(B) Between two adjoining lanes (first and second lanes) of the same direction, the driver's vehicle is traveling in the second lane.

(C) Between three contiguous lanes (first to third lanes) of the same direction, the driver's vehicle is traveling in the second lane (center lane).

FIGS. 4A to 4D each show a situation of travel concerning a preceding vehicle (5-1) and/or (5-2) when the driver's vehicle 5 is traveling in the first lane, as well as a training signal $T_1$. FIGS. 4A to 4D correspond to example situation (A) above. In the present specification, the first lane, the second lane, and so on, are ordered in the direction from top to bottom in each figure.

FIGS. 5A to 5D each show a situation of travel concerning a preceding vehicle (5-1) and/or (5-2) when the driver's vehicle 5 is traveling in the second lane, as well as a training signal $T_2$. FIGS. 5A to 5D correspond to example situation (B) above.

FIGS. 6A to 6E each show a situation of travel concerning a preceding vehicle (5-1), (5-2) and/or (5-3) when the driver's vehicle 5 is traveling in the center lane among three lanes, as well as a training signal $T_3$. FIGS. 6A to 6E correspond to example situation (C) above.

Figure 4A:
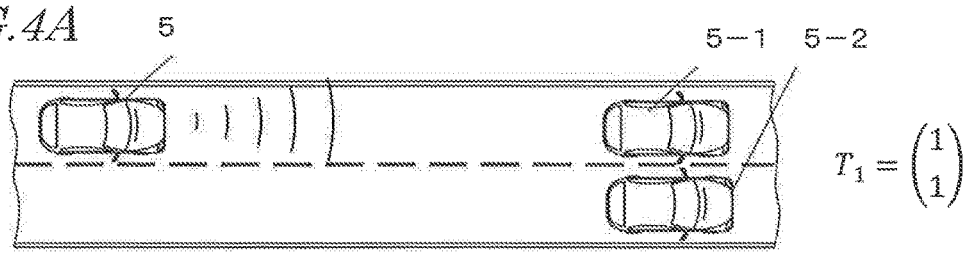
FIGS. 4A, 4B, 4C and 4D are diagrams each showing a situation of travel concerning a preceding vehicle (5-1) and/or (5-2) when the driver's vehicle 5 is traveling in the first lane, as well as a training signal $T_1$.
Figure 4B:
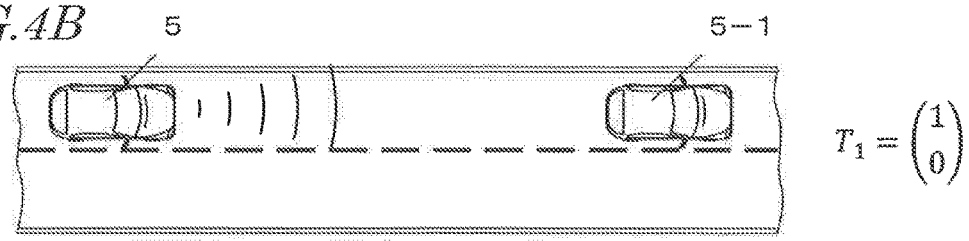
Figure 4C:
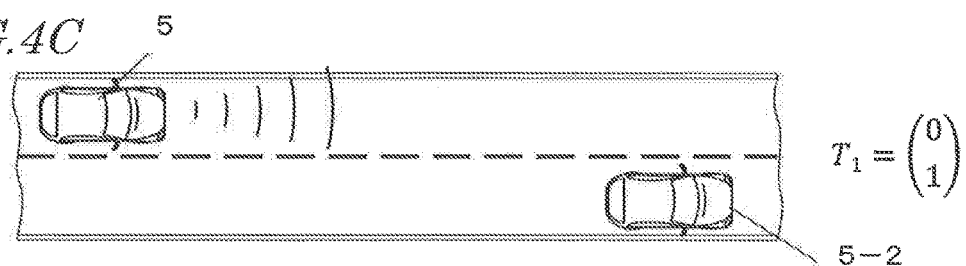
Figure 4D:
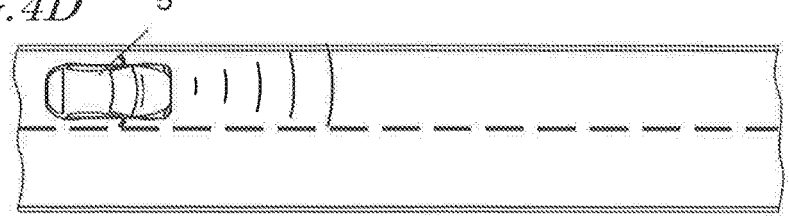
Figure 5A:
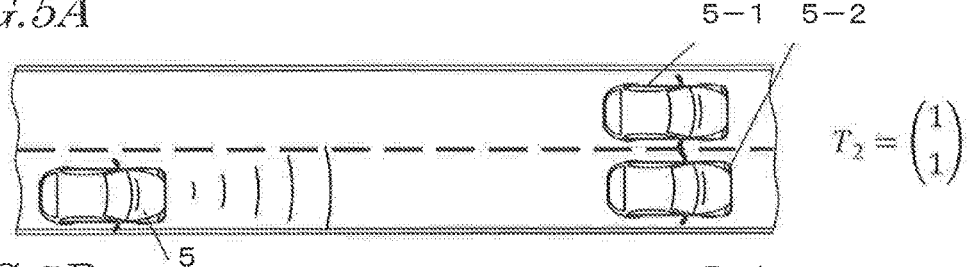
FIGS. 5A, 5B, 5C and 5D are diagrams each showing a situation of travel concerning a preceding vehicle (5-1) and/or (5-2) when the driver's vehicle 5 is traveling in the second lane, as well as a training signal $T_2$.
Figure 5B:
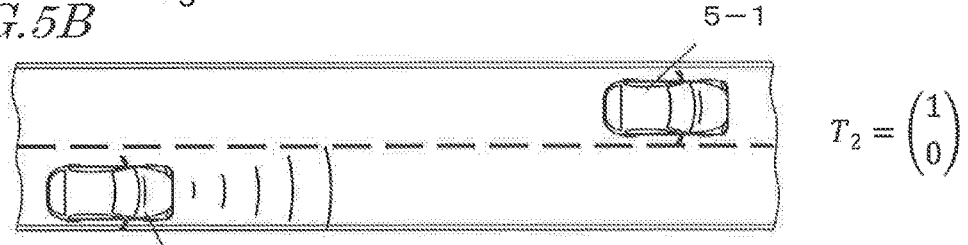
Figure 5C:
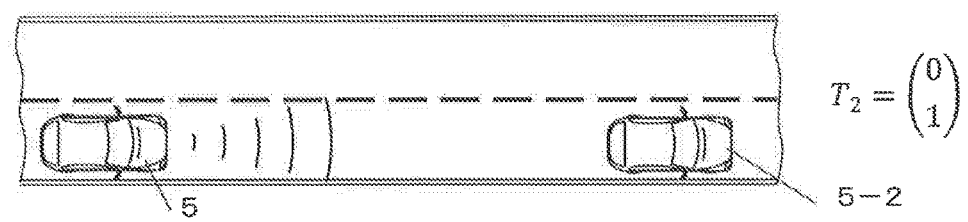
Figure 5D:
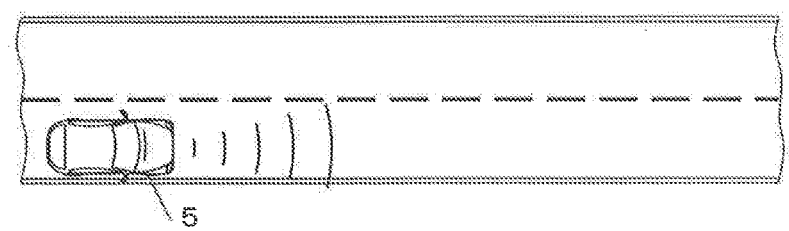

In the present specification, FIG. 4D and FIG. 5D are conveniently excluded from among the patterns of preceding vehicles to be detected by using the radar system. Hereinafter, three patterns of in FIGS. 4A, 4B and 4C and FIGS. 5A, 5B and 5C will be discussed.

Note also that FIGS. 6A to 6E do not encompass all situations of travel. In actuality, situations of travel may exist in a total of 8 patterns, for example. Specifically, a pattern in which a single target (which in FIG. 6E is traveling in the third lane) is traveling in the second lane, a pattern in which a single target is traveling in the first lane, and a pattern in which no target exists are omitted. In FIGS. 6A to 6E, too, a pattern in which no preceding vehicle exists is conveniently excluded from among the patterns of targets to be detected by using the radar system.

In connection with example situation (C) above and FIGS. 6A to 6E, what makes it unnecessary to consider the cases of the driver's vehicle traveling in the first lane or the third lane among three contiguous lanes of the same direction is because the inventors have adopted the following operating condition: the radar system shall be able to recognize another car in an adjoining lane when the driver's vehicle switches lanes. When the driver's vehicle switches from the first lane to the second lane, it suffices if vehicles in the first lane and the second lane can be identified; this case can be regarded as the example situations (A) or (B) defined above. The same is also true when the driver's vehicle switches from the third lane to the second lane.

Figure 7:
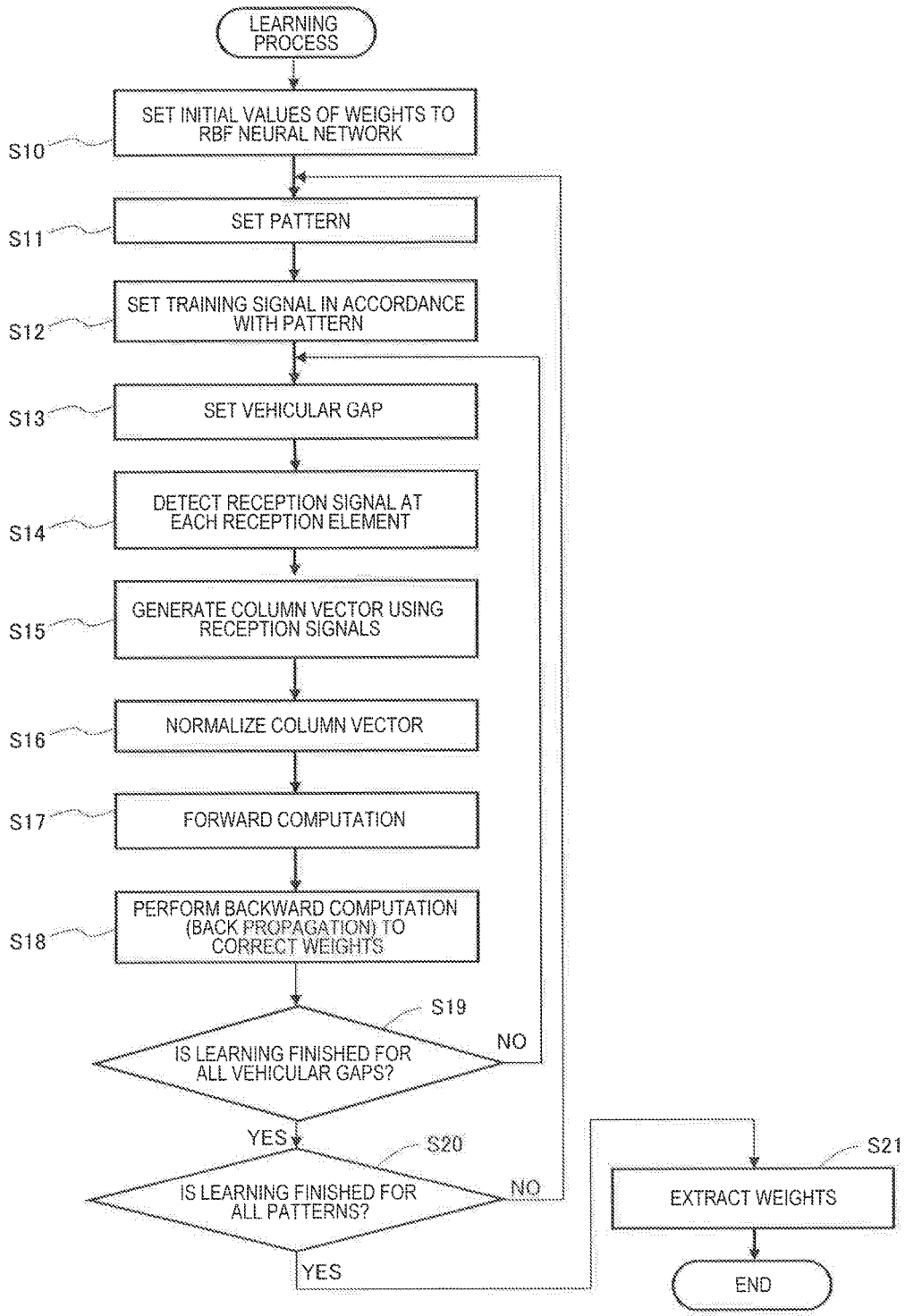
FIG. 7 is a flowchart showing the procedure of a learning process.

FIG. 7 is a flowchart showing a procedure of the learning process. Through the learning process, three kinds of neural network are to be established: a neural network of the case where the driver's vehicle exists in the first lane between two lanes of the same direction (FIGS. 4A to 4D); a neural network of the case where the driver's vehicle exists in the second lane between two lanes of the same direction (FIGS. 5A to 5D); and a neural network of the case where the driver's vehicle exists in the second lane among three lanes of the same direction (FIGS. 6A to 6E).

In the example of FIGS. 4A to 4D, the learning process establishes one neural network from the three patterns shown in FIGS. 4A, 4B and 4C. In the example of FIGS. 5A to 5D, the learning process establishes one neural network from the three patterns shown in FIGS. 5A, 5B and 5C. In the example of FIGS. 6A to 6D, the learning process establishes one neural network from seven patterns including FIGS. 6A, 6B, 6C, 6D and 6E. Furthermore, the learning process is preferably performed at least about 80 times, for example, for each pattern, under varying conditions concerning the vehicular gap between the driver's vehicle and a preceding vehicle. Specifically, the vehicular gap preferably is varied in about 1 m increments from about 20 m to about 100 m, for example; for each vehicular gap that is set, the learning process emits a radio wave, and uses reception signals that are obtained from reflected waves having been received, and generates an input vector b (Equation 4) for the respective vehicular gap. The learning results to be attained are weights which will allow the input vector b to accurately map to the training signal for each pattern shown in FIGS. 4A to 4D, FIGS. 5A to 5D, or FIGS. 6A to 6E.

Hereinafter, FIG. 7 will be described. The process shown in FIG. 7 is to be performed in each of the situations of FIGS. 4A to 4D, FIGS. 5A to 5D, and FIGS. 6A to 6E. Each process in FIG. 7 is executed by a signal processing circuit. The signal processing circuit may be, for example, a processor, microprocessor, CPU, etc., which is mounted in a piece of equipment owned by the manufacturer who makes the radar system for onboard use.

At step S10, the signal processing circuit sets initial values of weights to the RBF neural network.

At step S11, the signal processing circuit sets a pattern to be learned.

At step S12, the signal processing circuit sets a training signal in accordance with the pattern.

At step S13, the signal processing circuit sets a vehicular gap. The initial value preferably is about 20 m, for example.

At step S14, a reception signal is detected at each reception element.

At step S15, the signal processing circuit generates a column vector b0 (e.g., Equation 3) by using the detected reception signals.

At step S16, the signal processing circuit determines a column vector b (Equation 4) by normalizing the column vector b0.

At step S17, the signal processing circuit performs computation (forward computation) by using Equation 5 and Equation 6.

At step S18, the signal processing circuit determines a mean squared error between the obtained results and the training signal serving as a reference, and performs computation (backward computation) of correcting the weights so as to minimize the mean squared error. The corrected weights are to be utilized in any subsequent learning.

At step S19, the signal processing circuit determines whether learning has been finished with respect to all vehicular gaps. If such is finished, the process proceeds to step S20; if such is not finished, the process returns to step S13. Upon returning to step S13, a vehicular gap which is incremented by about 1 m, for example, preferably is set.

At step S20, the signal processing circuit determines whether learning has been finished for all patterns. It such is finished, the process proceeds to step S21; if such is not finished, the process returns to step S11. Upon returning to step S11, another pattern is set.

At step S21, the signal processing circuit extracts the obtained weights as the result of learning (learned data).

Thus, the learning process is finished.

Steps S14 to S16 above may have been performed in advance. That is, the following may have been separately performed in a previous instance: continuously acquire reception signals while varying the vehicular gap and store the acquired information; and generate the aforementioned column vector.

Although the above description illustrates the two-lane examples of FIGS. 4A to 4D and FIGS. 5A to 5D separately from the three-lane example of FIGS. 6A to 6E, such is just an exemplification and is in no way limiting. Instead of using a three-lane pattern, two-lane patterns may be used in combination. For example, the pattern of FIG. 6A can be realized as a combination of the two patterns of FIG. 4A and FIG. 5A. The pattern of FIG. 6B can be realized as a combination of the two patterns of FIG. 4A and FIG. 5C. The pattern of FIG. 6C can be realized as a combination of the two patterns of FIG. 4C and FIG. 5B. The pattern of FIG. 6D can be realized as a combination of the two patterns of FIG. 4B and FIG. 5A. The pattern of FIG. 6E can be realized as a combination of the two patterns of FIG. 4C and FIG. 5D. Note that the patterns of FIG. 4D and FIG. 5D can be recognized through an image recognition process using a camera as will be described later, for example.

Other patterns not shown in FIGS. 6A to 6E can also be specified by combining two-lane patterns. When such variants are adopted, the learning process may only be directed to the two lanes illustrated in FIGS. 4A to 4D and FIGS. 5A to 5D.

Figure 8:
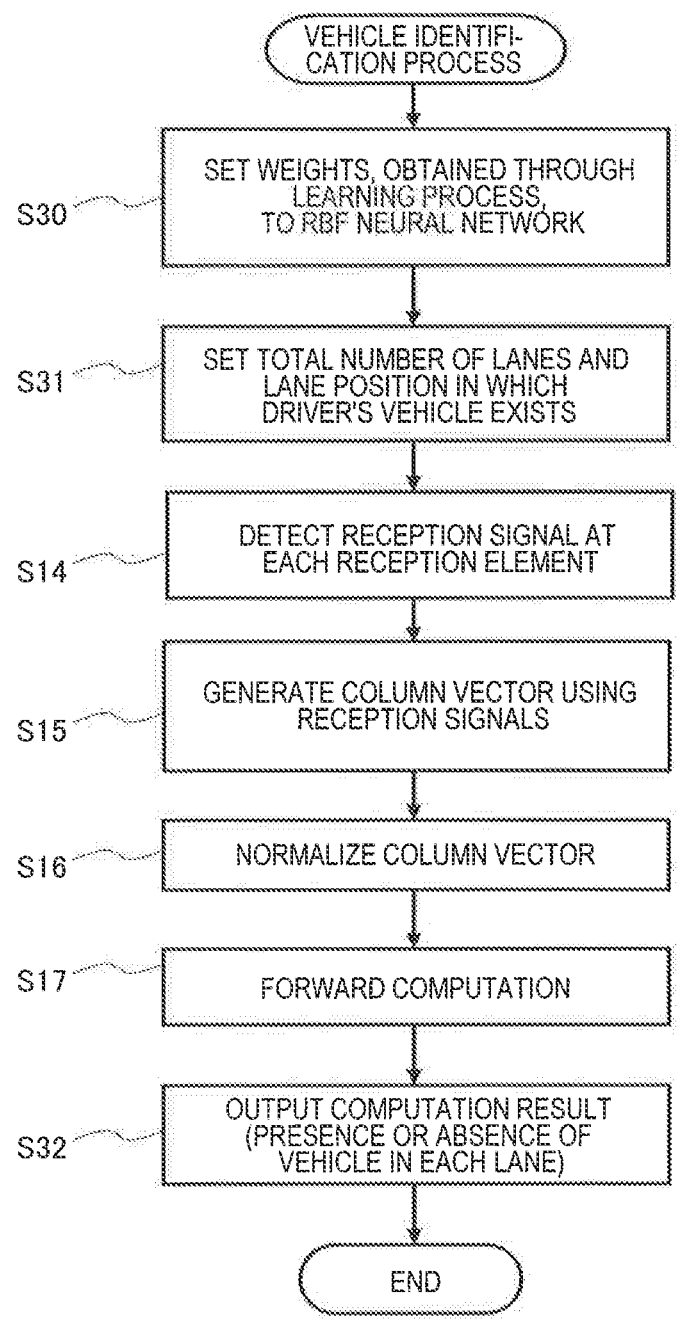
FIG. 8 is a flowchart showing the procedure of a preceding vehicle identification process.

FIG. 8 is a flowchart showing a procedure of a preceding vehicle identification process. This process is to be subsequently executed by using the learned data which is obtained by performing the learning process shown FIG. 7. Each process step of FIG. 8 is also executed by the signal processing circuit. However, this signal processing circuit does not need to be the same signal processing circuit that executed the processes of FIG. 7. The signal processing circuit that executes the process of FIG. 8 may be contained in an electronic control unit (ECU) of the radar system which is mounted in the vehicle, for example.

FIG. 8 includes steps S14 to S17, which are identical to those in the process of FIG. 7. These are denoted by like step numbers, with their descriptions being omitted.

At step S30, the signal processing circuit sets to the RBF neural network the weights (learned data) which have been obtained through the learning process.

At step S31, the signal processing circuit sets a total number of road lanes containing traffic in the same direction as the driver's vehicle is traveling, and also sets a current lane position of the driver's vehicle. In the present specification, the total number of lanes is preferably assumed to be two or three, for example. In the case where two lanes of the same direction exist, the current lane position of the driver's vehicle is preferably assumed to be the first lane or the second lane; in the case where three lanes of the same direction exist, the current lane position of the driver's vehicle is preferably assumed to be the first lane, the second lane, or the third lane. In the example of three lanes, any situation where the driver's vehicle is in the first lane or the third lane may be treated as an instance where the total number of lanes is two.

Next, at step S14, the signal processing circuit detects reception signals. At this point, the vehicular gap between the driver's vehicle and the preceding vehicle does not need to be specified; however, preferably, it is within the range from about 20 m to about 100 m, for example, for which the learning has been performed. Thereafter, steps S15 to S17 are consecutively performed.

At step S32, the signal processing circuit outputs a result T of computation performed at step S17. An exemplary output of the computation result T may be as follows.

$$T=[10]^T \quad \text{(a)}$$

$$T=[01]^T \quad \text{(b)}$$

$$T=[11]^T \quad \text{(c)}$$

The right-hand side expression of the computation result T indicates presence or absence of a preceding vehicle in each lane. In the case of two lanes, the first row in the column vector indicates presence or absence of a preceding vehicle in the first lane, and the second row in the column vector indicates presence or absence of a preceding vehicle in the second lane. For example, the output result T in (b) above indicates that no preceding vehicles in the first lane but that a preceding vehicle exists in the second lane.

At step S14 in FIG. 7 and FIG. 8 above, the vector $b_0$ is derived from the reception signals. As mentioned above, beat signals may be used as the vector $b_0$.

The aforementioned vector T representing the spatial distribution of preceding vehicles can be regarded as wave sources of the reflected waves. Then, the number of wave sources of the reflected waves, i.e., the number Z of waves, can be determined as a sum of the components of the above vector T. Specifically, in examples (a), (b) and (c) above, the number Z of waves is, respectively, 1, 1 and 2.

Thus, the principle by which the number of waves is determined according to the present disclosure has been described.

By utilizing this information of the number Z of waves in the maximum likelihood estimation computation, it becomes possible to estimate directions of arrival by using a high resolution algorithm for direction-of-arrival estimation, without generating imaginary array antenna signals.

In the case where a direction of arrival is to be estimated for each target, a very high estimation accuracy may possibly be required depending on the distance to the target. For example, in a situation where plural vehicles are traveling abreast of each other about 100 m ahead, for example, an angular resolution of about 1 degree or less will be required (assuming that wave sources of the respective preceding vehicles are about 2 m apart) in order to identify the direction of a reflected wave reflected from each vehicle (i.e., an arriving wave reaching the driver's vehicle). In order to realize such an angular resolution with a conventional technique, a high resolution algorithm for direction-of-arrival estimation will be needed, thus requiring a huge amount of computational processing.

On the other hand, with the inventors' technique of distinguishing the number of preceding vehicles by using a neural network, it is possible through simple computation to directly determine how many preceding vehicles there are, and which lanes the preceding vehicles are traveling in, by previously completing learning corresponding to the above-described situations.

Although the above description illustrates a real-valued neural network (RBF neural network) as an example, a complex-valued neural network may alternatively be used. A complex-valued neural network is known as a neural network in which the input/output signals and weights that would belong in a real-valued neural network are extended to complex numbers. Therefore, the activation function to determine the output of the hidden layer node is also a complex function.

In the case of using a complex-valued neural network, from the reception signal $I_m(t)$ of each antenna element, an orthogonal signal $Q_m(t)$ that is orthogonal to that real signal on the complex plane is derived. Then, $I_m(t)+jQ_m(t)$ is used as a respective input to the complex-valued neural network. The reception signal $I_m(t)$ corresponds to the earlier-mentioned $s_m$. The orthogonal signal $Q(t)$ is obtained by, for example, applying Hilbert transform to the reception signal of each antenna element. Note that a well-known Hilbert transformer may be used in applying Hilbert transform to the reception signal $I_m(t)$. Learning of the complex-valued neural network, and the identification process after the learning, can be performed by a signal processing circuit similar to the aforementioned processes of FIG. 7 and FIG. 8, except that the weights and activation function are different. Specific examples of the activation function to be used in a complex-valued neural network are omitted from illustration.

Embodiments

Hereinafter, with reference to the drawings as necessary, preferred embodiments of the present invention will be described in detail. Note however that unnecessarily detailed descriptions may be omitted. For example, detailed descriptions of what is well known in the art or redundant descriptions of what is substantially the same constitution may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims.

Figure 9:
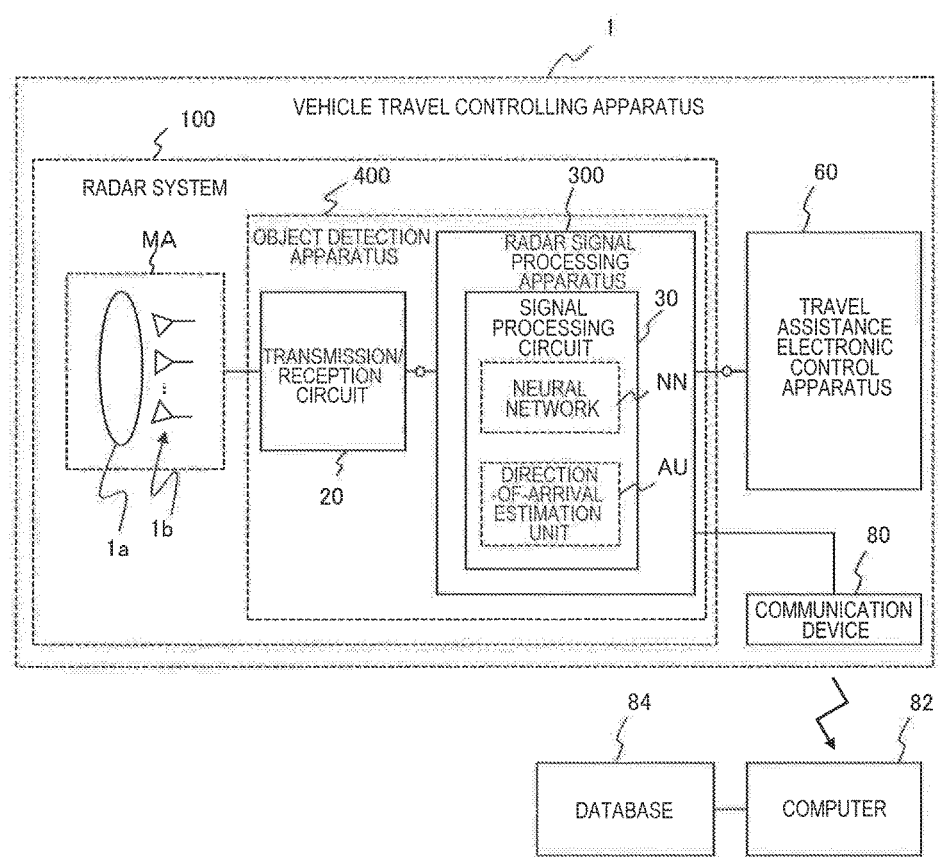
FIG. 9 is a block diagram showing an exemplary fundamental construction of a vehicle travel controlling apparatus 1 according to a preferred embodiment of the present invention.

First, FIG. 9 is referred to. FIG. 9 is a block diagram showing an exemplary fundamental construction of a vehicle travel controlling apparatus 1 according to a preferred embodiment of the present invention. The vehicle travel controlling apparatus 1 shown in FIG. 9 includes a radar system 100 which is mounted in a vehicle, and a travel assistance electronic control apparatus 60 which is connected to the radar system 100. The radar system 100 preferably includes: an independent multibeam antenna MA having a plurality of antenna elements each of which outputs a reception signal in response to one or plural arriving waves; and an object detection apparatus 400. The object detection apparatus 400 includes a transmission/reception circuit 20 and a radar signal processing apparatus 300.

The independent multibeam antenna MA may include, for example, a dielectric lens or reflector, and a plurality of antenna elements. In the example shown in FIG. 9, the independent multibeam antenna MA includes a dielectric lens 1a with a plurality of focal points and a plurality of antenna elements (beam elements) 1b respectively provided at the plurality of focal points. The plurality of focal points are discretely present on the focal plane. In this example, by the action of the dielectric lens 1a, electromagnetic waves which are emitted by the respective beam elements each acquire directivity in a beam shape, and propagate in mutually different directions in a space. A part of these beams is reflected off a target, and return to the independent multibeam antenna MA as arriving waves. The arriving waves incident on the dielectric lens 1a are converged by the dielectric lens 1a onto the focal plane of the dielectric lens 1a. Which position on the focal plane each one is converged at is dependent on the incident angle with respect to the independent multibeam antenna MA. Although the present embodiment illustrates that the independent multibeam antenna MA includes the dielectric lens 1a, it may also be any lens other than a dielectric lens.

In the onboard radar system 100, the independent multibeam antenna MA and the transmission/reception circuit 20 preferably are attached to the vehicle, while at least some of the functions of the radar signal processing apparatus 300 may preferably be implemented by a computer 82 and a database 84 which are preferably provided externally to the vehicle travel controlling apparatus 1 (e.g., outside of the driver's vehicle). In that case, via a communication device of the vehicle and a commonly-available communications network, the portions of the radar signal processing apparatus 300 that are located within the vehicle may be perpetually or occasionally connected to the computer 82 and database 84 external to the vehicle so that bidirectional communications of signal or data are possible.

The database 84 may store learned data of a neural network and a program which defines various signal processing algorithms. The content of the data and program needed for the operation of the radar system 100 may be externally updated via the communication device 80. Thus, at least some of the functions of the radar system 100 can be realized externally to the driver's vehicle (which is inclusive of the interior of another vehicle), for example, by a cloud computing technique. Therefore, an "onboard" radar system in the meaning of the present disclosure does not require that all of its constituent elements be mounted within or on the (driver's) vehicle. However, for simplicity, the present application will describe an example implementation in which all constituent elements according to the present disclosure are mounted in a single vehicle (i.e., the driver's vehicle), unless otherwise specified. However, this example implementation is in no way limiting.

The radar signal processing apparatus 300 includes a signal processing circuit 30 in which a learned neural network NN has been established. The construction and operation of the neural network NN are as described earlier. The signal processing circuit 30 receives reception signals from the transmission/reception circuit 20, and inputs the reception signals, or a secondary signal(s) (e.g., a beat signal(s)) which has been generated from the reception signals, to the neural network NN. A part or a whole of the circuit (not shown) which generates a secondary signal(s) from the reception signals may be provided in e.g. the transmission/reception circuit 20, or in the radar signal processing apparatus 300 or the signal processing circuit 30.

The signal processing circuit 30 is configured or programmed to perform computation by using the reception signals or secondary signal(s), as well as learned data of the neural network NN, and output a signal indicating the number of arriving waves (number Z of waves). As used herein, "a signal indicating the number of arriving waves (number Z of waves)" typically is a signal indicating the aforementioned "spatial distribution of vehicles". "A signal indicating the number of arriving waves" can be said to be a signal indicating the number of preceding vehicles (which may be one preceding vehicle or plural preceding vehicles that are traveling abreast of each other) ahead of the driver's vehicle.

The signal processing circuit 30 may be configured or programmed to execute various signal processing which is executable by known radar signal processing apparatuses. The signal processing circuit 30 may be configured or programmed to execute a "super-resolution algorithm" to be described later.

In the example shown in FIG. 9, separately from the neural network NN, an arriving wave estimation circuit AU is provided in the signal processing circuit 30. The arriving wave estimation circuit AU is configured or programmed to estimate an angle representing the azimuth of each arriving wave by an algorithm for direction-of-arrival estimation which will be described later in detail, and output a signal indicating the estimation result. The signal processing circuit 30 may be configured or programmed to estimate the distance to each target as a wave source of an arriving wave, the relative velocity of the target, and the azimuth of the target by using a known algorithm which is executed by the arriving wave estimation circuit AU, and output a signal indicating the estimation result.

In the present disclosure, the term "signal processing circuit" is not limited to a single circuit, but encompasses any implementation in which a combination of plural circuits is conceptually regarded as a single functional circuitry or processor, microprocessor, CPU, etc. The signal processing circuit may be realized by one or more System-on-Chips (SoCs). For example, a part or a whole of the signal processing circuit 30 may be an FPGA (Field-Programmable Gate Array), which is a programmable logic device (PLD). In that case, the signal processing circuit 30 may preferably include a plurality of computation elements (e.g., general-purpose logics and multipliers) and a plurality of memory elements (e.g., look-up tables or memory blocks). Alternatively, the signal processing circuit 30 may be defined by a set of a general-purpose processor(s) and a main memory device(s). The signal processing circuit 30 may be a circuit which includes a processor core(s) and a memory device(s). These may function as a signal processing circuit in the meaning of the present disclosure. In particular, with the advent of onboard computers which excel in parallel processing, the neural network NN is now easily realized by combining general-purpose hardware with special-purpose software which executes the algorithms, functions, flowchart processes, etc., according to various preferred embodiments of the present invention described and illustrated in detail in the present disclosure.

In the present specification, the signal processing circuit is indifferent as to whether it includes any storage devices or not; it suffices if the signal processing circuit is able to allow a given signal to be supplied as an input to the neural network, perform computation by applying learned data, and output a result. A signal processing circuit that is capable of such operation may be referred to as "a signal processing circuit in which a learned neural network has been established".

The travel assistance electronic control apparatus 60 is configured or programmed to provide travel assistance for the vehicle based on various signals which are output from the radar signal processing apparatus 300. The travel assistance electronic control apparatus 60 instructs various electronic control units or controllers to fulfill the following functions, for example: a function of issuing an alarm to prompt the driver to make a braking operation when the distance to a preceding vehicle (vehicular gap) has become shorter than a predefined value; a function of controlling the brakes; and a function of controlling the accelerator. For example, in the case of an operation mode which performs adaptive cruise control (which hereinafter may also be referred to as "ACC") of the driver's vehicle, the travel assistance electronic control apparatus 60 sends predetermined signals to various electronic control units or controllers (not shown) and actuators, to maintain the distance of the driver's vehicle to a preceding vehicle at a predefined value, or maintain the traveling velocity of the driver's vehicle at a predefined value.

The signal processing circuit 30 may or may not operate depending on the substance of the control that is exercised by the travel assistance electronic control apparatus 60. For example, depending on the conditions for travel control, the signal processing circuit 30 may utilize only one of the neural network NN and the arriving wave estimation circuit AU, switch between them, or consecutively use them one after the other to operate. As a result, the signal processing circuit 30 outputs to the travel assistance electronic control apparatus 60 a spatial distribution pattern of a preceding vehicle or plural preceding vehicles that are abreast of each other, or information of an estimated angle representing the azimuth of each arriving wave.

The signal processing circuit 30 may have an operation mode which outputs only a signal indicating a spatial distribution pattern of a preceding vehicle or plural preceding vehicles that are abreast of each other. Under this operation mode, the neural network NN is utilized, while the arriving wave estimation circuit AU is not operated.

Once a spatial distribution of preceding vehicles is determined by the neural network NN, the number of preceding vehicles, i.e., the number of arriving waves, is able to be determined. Based on information of the number of arriving waves as detected by the neural network NN, it becomes possible to run an algorithm for direction-of-arrival estimation (described later) and estimate the directions of preceding vehicles with a high accuracy.

Hereinafter, a process of direction estimation for preceding vehicles based on an algorithm for direction-of-arrival estimation will be described in detail.

First, with reference to FIG. 10 to FIG. 13, the transmission/reception circuit 20 is described. Thereafter, the signal processing circuit 30 is described with reference to FIG. 14 and FIG. 15.

Figure 10:
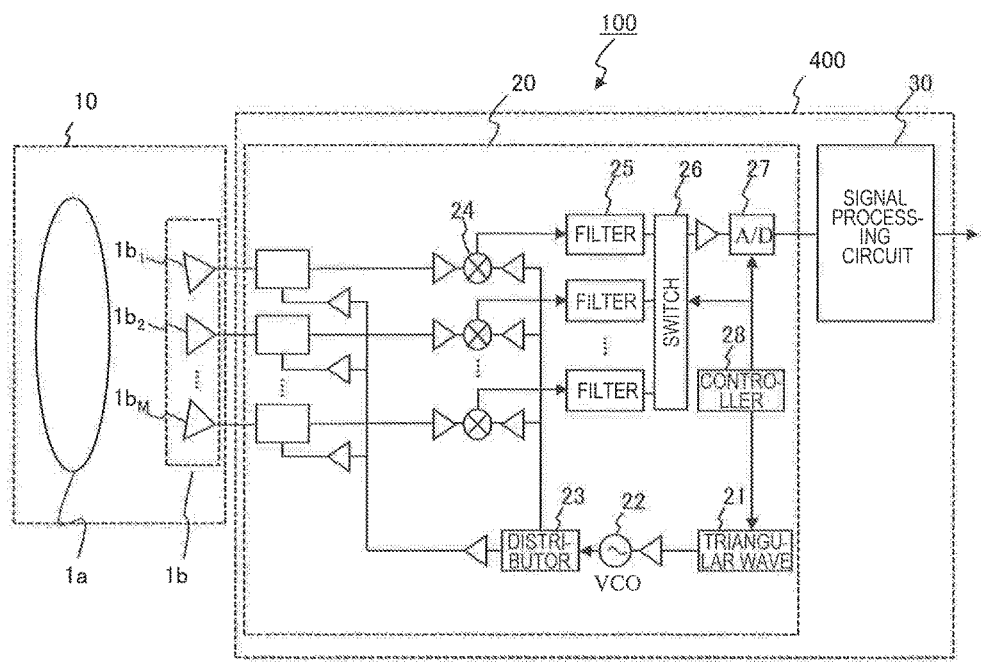
FIG. 10 is a diagram showing a detailed hardware construction of a transmission/reception circuit 20.

FIG. 10 shows a detailed hardware construction of the transmission/reception circuit 20. The transmission/reception circuit 20 receives reception signals from the antenna apparatus 10, subjects them to processing as described below, and sends digital data to the signal processing circuit 30.

The antenna apparatus 10 is a structure including an independent multibeam antenna MA (FIG. 9). The antenna apparatus 10 is capable of transmission and reception of electromagnetic waves, which herein are millimeter waves. The antenna apparatus 10 includes a dielectric lens $1a$ and a plurality of antenna elements (beam elements) $1b$. The antenna elements are denoted as "antenna element $1b_1$", "antenna element $1b2$", and so on. The antenna apparatus 10 includes M antenna elements $1b_1$, $1b_2$, ..., and $1b_M$ (where M is an integer of 3 or more). The antenna elements $1b_1$ to $1b_M$ are disposed at the respective focal points of the dielectric lens $1a$. In response to arriving waves, the antenna elements $1b_1$, $1b_2$, ..., and $1b_M$ output reception signals $S_1$, $S_2$, and $S_M$.

Figure 11:
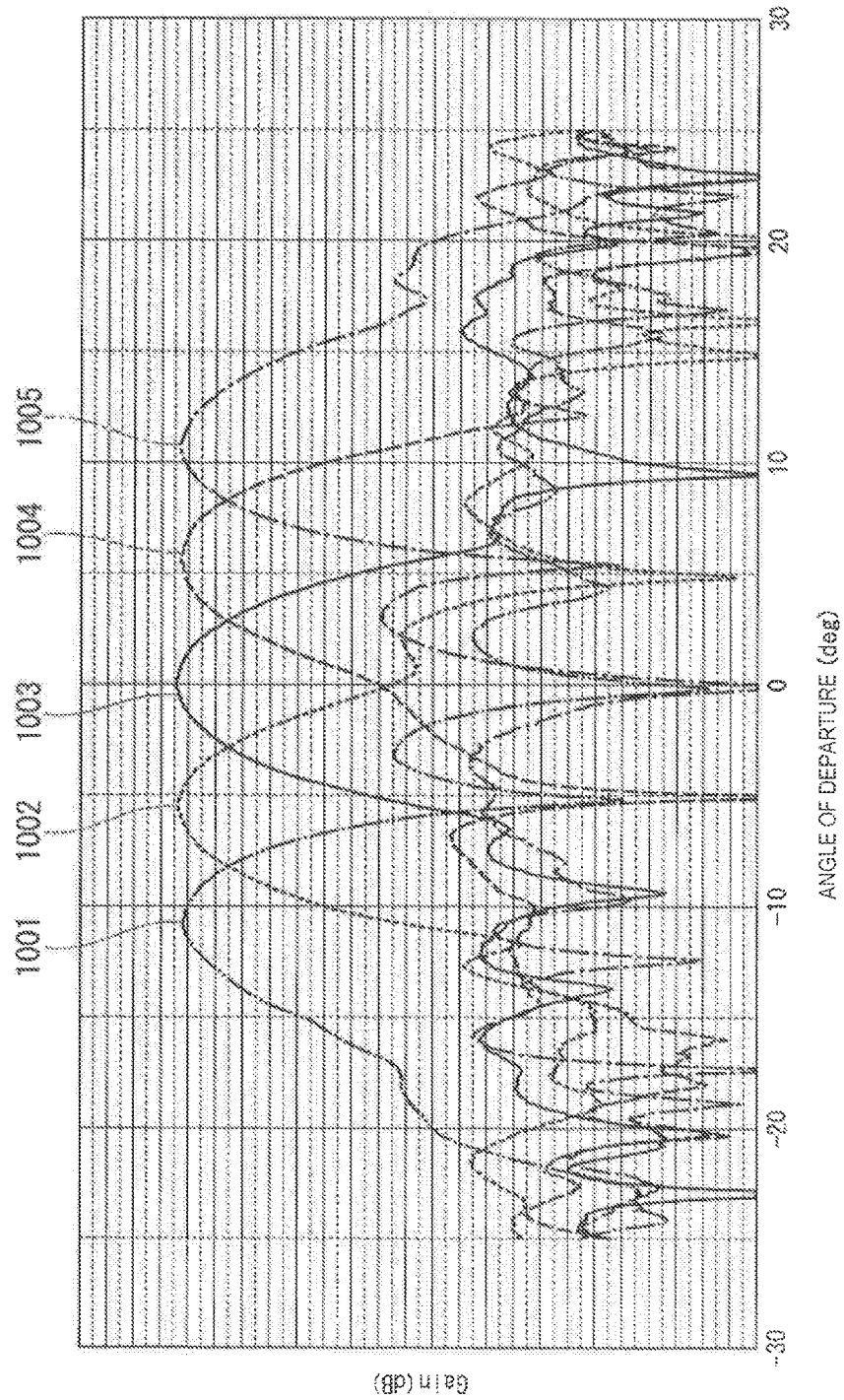
FIG. 11 is a graph showing an example directivity of an independent multibeam in an illustrative embodiment of the present disclosure.

FIG. 11 is a graph showing an example directivity of an independent multibeam in an embodiment of the present invention.

In the graph of FIG. 11, the horizontal axis represents the angle of departure, and the vertical axis represents gain. This example illustrates a relationship between the angles of departure of a multibeam (consisting of five beams) and gain, i.e., beam directivity. Specifically, a signal 1001 of a first beam, a signal 1002 of a second beam, a signal 1003 of a third beam, a signal 1004 of a fourth beam, and a signal 1005 of a fifth beam are shown.

Although FIG. 11 illustrates an example of beams from five elements, the FOV (viewing angle), beam width, number of beam elements, and the like can be arbitrarily set in accordance with the radar's application and specifications. In particular, an independent multibeam antenna method using a lens antenna would be suitable because it would allow for flexible settings based on the lens shape and the position of the primary feed (beam element).

Regarding the number of plural beam elements $1b_1$ to $1b_M$ (M) included in the antenna capable of transmission and reception, note the following in connection with detection of multiple targets: in the case of e.g. a maximum likelihood estimation technique, detection of (M−1) targets, i.e., one fewer than the number of plural beam elements $1b_1$ to $1b_M$, is possible.

FIG. 10 is referred to again.

The transmission/reception circuit 20 includes a triangular wave generation circuit 21, a VCO (voltage controlled oscillator) 22, a distributor 23, mixers 24, filters 25, a switch 26, an A/D converter 27, and a controller 28. Although the radar system in the present preferred embodiment is configured or programmed to perform transmission and reception of millimeter waves by the FMCW method, the radar system of the present disclosure is not limited to this method. The transmission/reception circuit 20 is configured or programmed to generate a beat signal based on a reception signal from the independent multibeam antenna MA and a transmission signal from the transmission antenna TA.

Hereinafter, the construction and operation of the transmission/reception circuit 20 will be described in detail.

Figure 12:
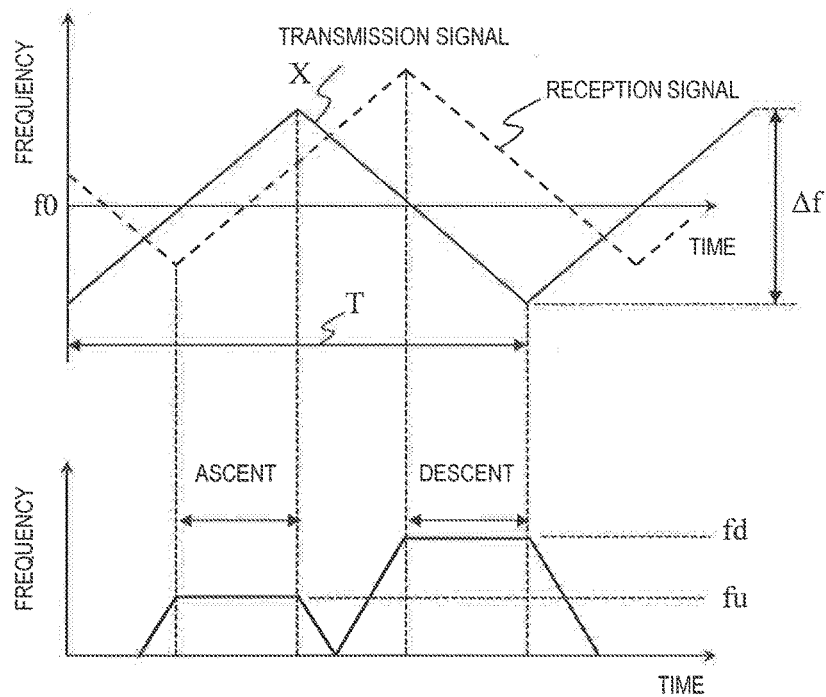
FIG. 12 is a diagram showing change in frequency of a transmission signal which is modulated based on a signal that is generated by a triangular wave generation circuit 21.

The triangular wave generation circuit 21 generates a triangular wave signal, and supplies it to the VCO 22. The VCO 22 outputs a transmission signal having a frequency as modulated based on the triangular wave signal. FIG. 12 is a diagram showing change in frequency of a transmission signal which is modulated based on the signal that is generated by the triangular wave generation circuit 21. This waveform has a modulation width Δf and a center frequency of f0. The transmission signal having a thus modulated frequency is supplied to the distributor 23. The distributor 23 allows the transmission signal obtained from the VCO 22 to be distributed among the mixers 24 and the transmission antenna TA. Thus, the transmission antenna emits a millimeter wave having a frequency which is modulated in triangular waves, as shown in FIG. 12.

In addition to the transmission signal, FIG. 12 also shows an example of a reception signal from an arriving wave which is reflected from a single preceding vehicle. The reception signal is delayed from the transmission signal. This delay is in proportion to the distance between the driver's vehicle and the preceding vehicle. Moreover, the frequency of the reception signal increases or decreases in accordance with the relative velocity of the preceding vehicle, due to the Doppler effect.

When the reception signal and the transmission signal are mixed, a beat signal is generated based on their frequency difference. The frequency of this beat signal (beat frequency) differs between a period in which the transmission signal increases in frequency (ascent) and a period in which the transmission signal decreases in frequency (descent). Once a beat frequency for each period is determined, based on such beat frequencies, the distance to the target and the relative velocity of the target are calculated.

Figure 13:
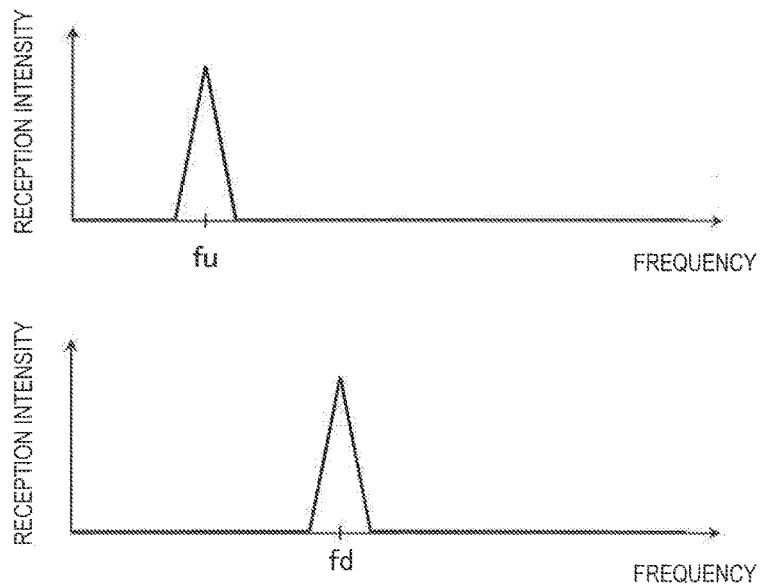
FIG. 13 is a diagram showing a beat frequency fu in an "ascent" period and a beat frequency fd in a "descent" period.
Figure 14:
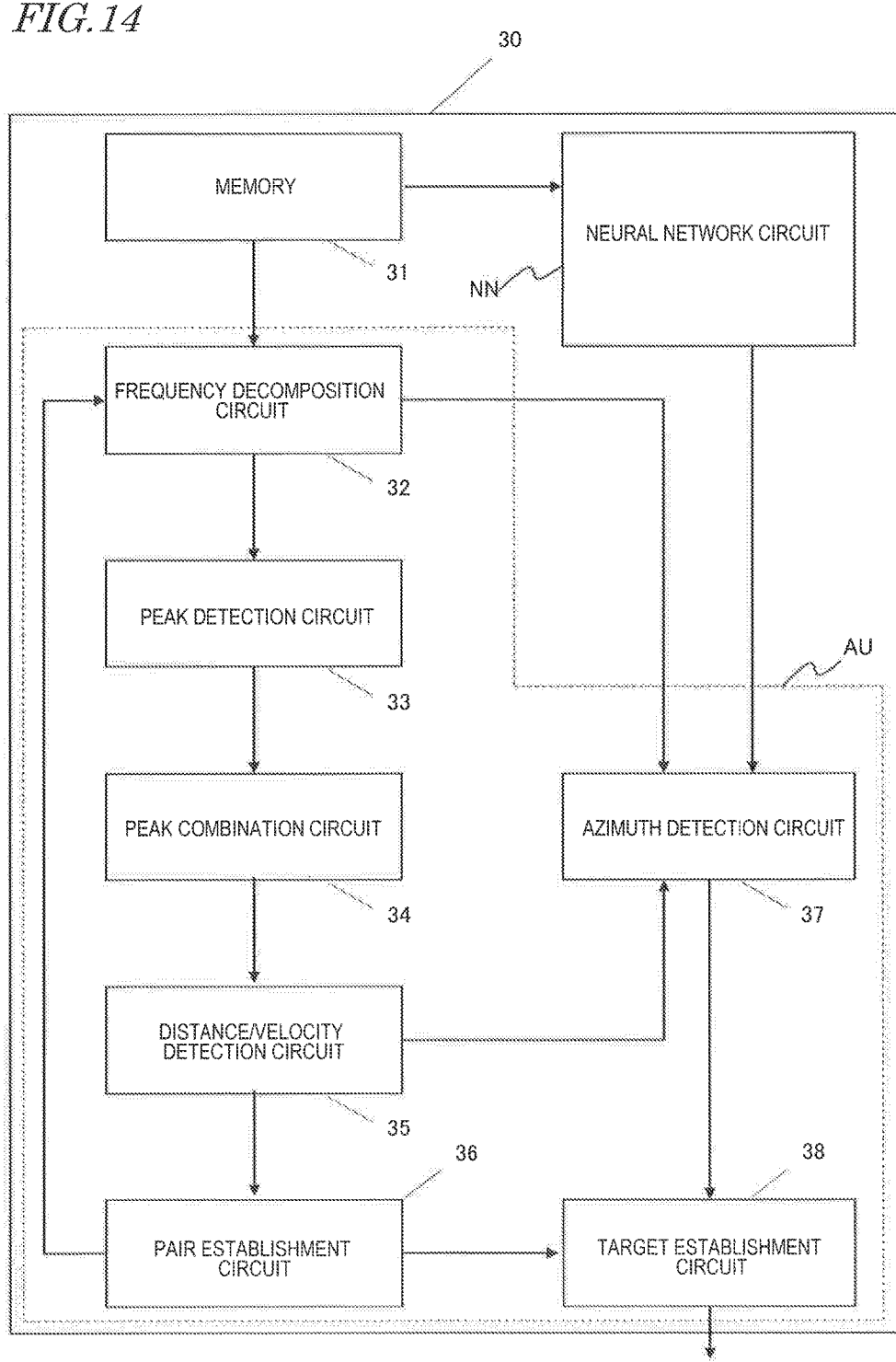
FIG. 14 is a diagram showing a detailed hardware construction of a signal processing circuit 30.
Figure 16:
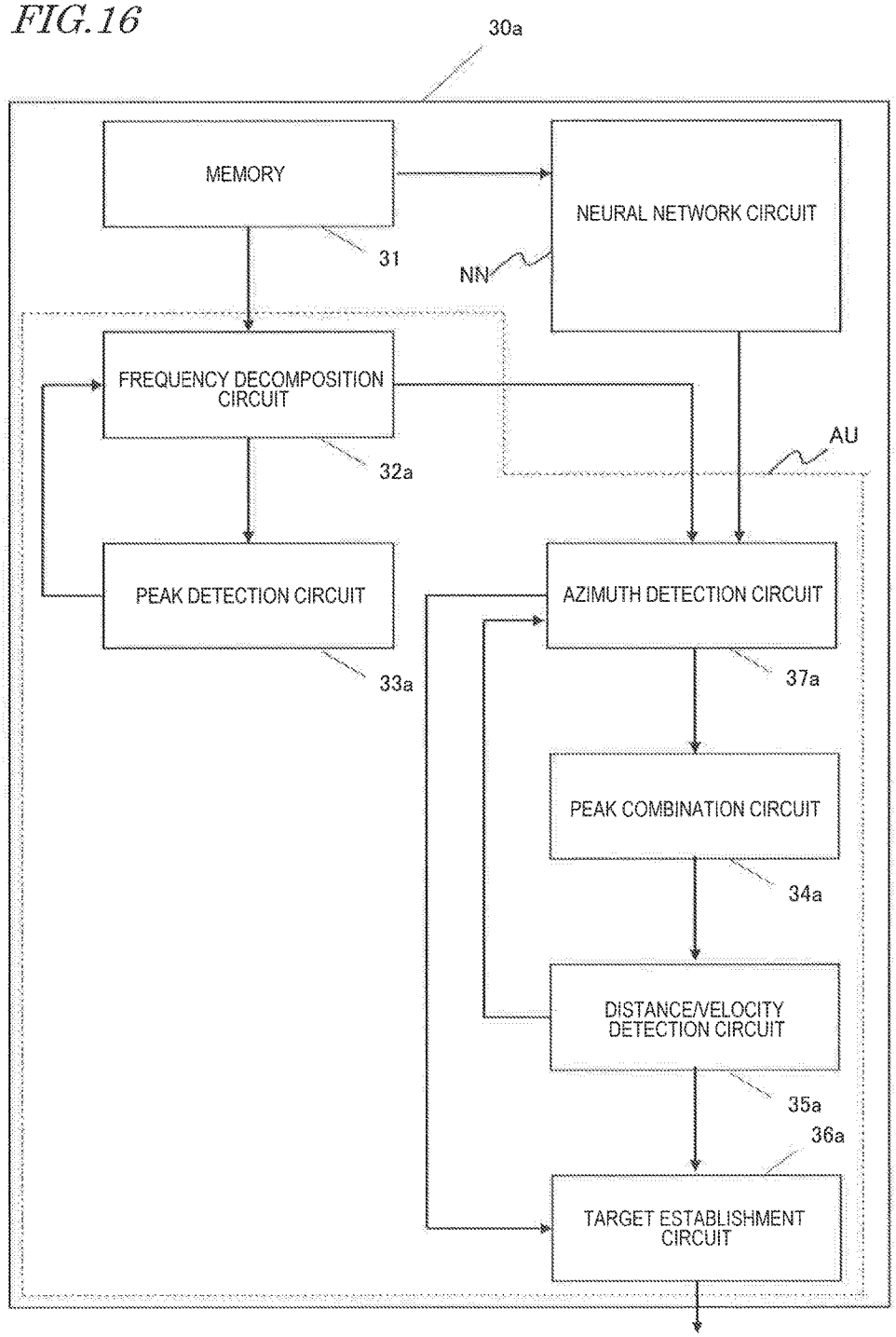
FIG. 16 is a diagram showing a detailed hardware construction of a signal processing circuit 30a as a variant of the signal processing circuit 30.

FIG. 13 shows a beat frequency fu in an "ascent" period and a beat frequency fd in a "descent" period. In the graph of FIG. 13, the horizontal axis represents frequency, and the vertical axis represents signal intensity. This graph is obtained by subjecting the beat signal to time-frequency conversion. Once the beat frequencies fu and fd are obtained, the distance r to the target is calculated based on Equation 7 below, and the relative velocity v of the target is calculated based on Equation 8. Note that this computation is performed by a distance/velocity detection circuit 35 described later (FIG. 14, FIG. 16).

$$r=\{C \cdot T/(2 \cdot \Delta f)\} \cdot \{(fu+fd)/2\}$$ Equation 7

$$v=\{C/(2 \cdot f0)\} \cdot \{(fu-fd)/2\}$$ Equation 8

In the equation which calculates the distance r and the relative velocity V, C is velocity of light, and T is the modulation period.

Note that the lower limit resolution of distance r is expressed as $C/(2\Delta f)$. Therefore, as Δf increases, the resolution of distance r increases. In the case where the frequency f0 is approximately in the 76 gigahertz (GHz) band, when Δf is set on the order of 600 megahertz (MHz), the resolution of distance r will be on the order of about 0.7 meters (m), for example. Therefore, if two preceding vehicles are traveling abreast of each other, it may be difficult with the FMCW method to identify whether there is one vehicle or two vehicles. In such a case, it might be possible to run an algorithm for direction-of-arrival estimation that has an extremely high angular resolution to separate between the azimuths of the two preceding vehicles and enable detection. However, as described earlier, running such an algorithm for direction-of-arrival estimation will require a huge amount of computational processing to be rapidly executed. Moreover, if a sudden change occurs in the situation of travel concerning preceding vehicles, the computation will not catch up with the change, so that two preceding vehicles that are traveling abreast of each other may be incorrectly estimated as one vehicle. However, according to the present preferred embodiment, it is possible through the use of the neural network NN to rapidly grasp a spatial distribution of preceding vehicles with a small computational processing amount, thus making it easy to avoid such mistakes.

In the present embodiment, with the construction and operation described below, beat frequencies corresponding to the antenna elements $1b_1$ to $1b_M$ of the antenna apparatus 10 are obtained, thus enabling estimation of the position information of a target.

FIG. 10 is again referred to. In the example shown in FIG. 10, reception signals from channels $Ch_1$ to $Ch_M$ corresponding to the respective antenna elements $1b_1$ to $1b_M$ are each amplified by an amplifier, and input to the corresponding mixers 24. Each mixer 24 mixes the transmission signal into the amplified reception signal. Through this mixing, a beat signal is generated corresponding to the frequency difference between the reception signal and the transmission signal. The generated beat signal is fed to the corresponding filter 25. The filters 25 apply bandwidth control to the beat signals on the channels $Ch_1$ to $Ch_M$, and supply bandwidth-controlled beat signals to the switch 26.

The switch 26 performs switching in response to a sampling signal which is input from the controller 28. The controller 28 may be a microcomputer, an electronic control unit, etc., for example. Based on a computer program which is stored in a memory such as a ROM, the controller 28 controls the entire transmission/reception circuit 20. The controller 28 does not need to be provided inside the transmission/reception circuit 20, but may be provided inside the signal processing circuit 30 as described later. Alternatively, some or all of the functions of the controller 28 may be realized by a central processing unit which controls the entire transmission/reception circuit 20 and signal processing circuit 30.

The beat signals on the channels $Ch_1$ to $Ch_M$ having passed through the respective filters 25 are consecutively supplied to the A/D converter 27 via the switch 26. In synchronization with the sampling signal, the A/D converter 27 converts the beat signals on the channels $Ch_1$ to $Ch_M$, which are input from the switch 26 in synchronization with a control signal from the controller 28 or a separately-received sampling signal, into digital signals.

Next, the construction and operation of the signal processing circuit 30 will be described in detail.

FIG. 14 shows a detailed hardware construction of the signal processing circuit 30. The signal processing circuit 30 in the present embodiment estimates the distance to a target and the relative velocity of the target by the FMCW method, and also performs maximum likelihood estimation by using information of the number Z of waves which is output from the neural network NN, to estimate the direction of arrival of a reception wave. Note that the FMCW method described below is an example; other methods may also be used, e.g., 2 frequency CW and spread spectrum methods.

The signal processing circuit 30 includes a memory 31, the neural network circuit NN, and the arriving wave estimation circuit AU.

The memory 31 may be a generic storage medium such as a semiconductor memory or a hard disk and/or an optical disk. The neural network circuit NN and the arriving wave estimation circuit AU may be as a whole be implemented by a single central processing circuit (a so-called CPU) or a processor. Alternatively, each of the neural network circuit NN and the arriving wave estimation circuit AU may be implemented by one or more CPUs.

The memory 31 receives chronological data of beat signals (each including an ascent portion and a descent portion) as digital signals having been converted by the A/D converter 27. In its storage area, the memory 31 stores the chronological data in association with the respective antenna elements $1b_1$ to $1b_M$. For example, if 256 times of sampling are made with respect to each of the ascent portion and the descent portion, then the memory 31 stores the data of 2×256×number M of elements in the storage area.

The neural network circuit NN is a circuit which performs computation based on Equation 5 above, and retains various parameters for specifying the Gaussian kernel function expressed by Equation 6, these parameters being needed for its computation. The neural network circuit NN performs the computation by using the digital data of beat signals stored in the memory 31 as an input, and outputs information indicating the number Z of waves.

By using the digital data of beat signals stored in the memory 31 and the information of the number Z of waves which is output from the neural network circuit NN, the arriving wave estimation circuit AU performs computation in which a maximum likelihood estimation technique is applied, thus estimating the directions of arrival of the arriving waves.

The arriving wave estimation circuit AU includes a frequency decomposition circuit 32, a peak detection circuit 33, a peak combination circuit 34, a distance/velocity detection circuit 35, a pair establishment circuit 36, a azimuth detection circuit 37, and a target establishment circuit 38.

For each channel from beam elements $1b_1$ to $1b_M$, the frequency decomposition circuit 32 applies a Fourier transform or the like to the beat signal, thus converting it into a beat frequency range. More specifically, through e.g. a Fourier transform, the frequency decomposition circuit 32 converts each of the beat signals, corresponding to $CH_1$ to $CH_M$, into a frequency component in accordance with a previously set frequency resolution, and outputs a frequency point indicative of a beat frequency and complex number data of that beat frequency. For example, with respect to each of the beam elements $1b_1$ to $1b_M$, when there is data from 256 times of sampling for each of the ascent portion and the descent portion, these are converted into a beat frequency for each of the beam elements $1b_1$ to $1b_M$ as frequency domain data in terms of a complex number, thus resulting in 128 pieces of complex number data for each of the ascent portion and the descent portion (i.e., there being data of 2×128×number of elements). Note that a beat frequency is represented by a frequency point.

The peak detection circuit 33 generates a frequency spectrum from the complex number data for the beam elements $1b_1$ to $1b_M$, thus detecting each peak value in the respective spectrum as a beat frequency, i.e., distance-dependent, potential presence of a target. More specifically, regarding the intensity peak values in each of the ascent region and the descent region of a triangular wave of a beat frequency after frequency conversion, the peak detection circuit 33 looks for peaks in signal intensity (or amplitude, etc.) by using the complex number data, to detect a beat frequency having a peak value that exceeds a previously set value (peak detection threshold). As a result, the peak detection circuit 33 detects the presence of a target as associated with beat frequency, and selects a target frequency.

With respect to the beat frequencies and the associated peak values which are output from the peak detection circuit 33 for the beam elements, the peak combination circuit 34 seeks combinations of beat frequencies and their peak values between the ascent region and the descent region in a round-robin matrix, thus to find every possible combination of beat frequencies from the ascent region and the descent region, and consecutively outputs the combinations to the distance/velocity detection circuit 35.

In the present embodiment, such combinations are made for each channel from beam elements $1b_1$ to $1b_M$. Therefore, presence of a target at each beam azimuth can be detected.

The distance/velocity detection circuit 35 computes a distance r from a target, based on a value which is obtained by taking a sum of each consecutively-incoming combination of an ascent beat frequency and a descent beat frequency. Also, the distance/velocity detection circuit 35 computes a relative velocity v of the target, based on a difference between the ascent beat frequency and the descent beat frequency in each consecutively-incoming combination.

In the present embodiment, such computation of distance r and relative velocity v is performed for each channel from beam elements $1b_1$ to $1b_M$.

For each channel, the pair establishment circuit 36 generates a first pair table from the incoming distances r, relative velocities v, and ascent and descent peak level values. Then, in the form of a second pair table, the pair establishment circuit 36 determines a proper combination of an ascent peak and a descent peak for each target, thus establishing a pair(s) of ascent and descent peaks. The pair establishment circuit 36 outputs to the target establishment circuit 38 a target group number(s) indicating the distance r and relative velocity v thus established.

The first pair table is a matrix of ascent beat frequencies and descent beat frequencies from the peak combination circuit 34, with a distance and a relative velocity being indicated at each cross-point (i.e., combination of an ascent beat frequency and a descent beat frequency) in the matrix.

The second pair table is a table indicating the distance, relative velocity, and frequency point(s) in association with each target group. As one example, the second pair table may store the distance, relative velocity, and frequency point(s) (ascent and/or descent) corresponding to each target group number. Note that the first pair table and the second pair table are stored in an internal storage area of the pair establishment circuit 36, for example.

The pair establishment circuit 36 may also adopt a technique of, for example: relying on the distance r and relative velocity v of each target as were finally established in a previous detection cycle to predict values for the current detection cycle; and selecting the combination(s) for the target group(s) while favoring the predicted values.

In addition, the pair establishment circuit 36 passes, to the frequency decomposition circuit 32, the frequency information that has led to the established pair for each channel. Receiving this frequency information, the frequency decomposition circuit 32 outputs specific frequency point data (complex number data) of the beam elements $1b_1$ to $1b_M$ (CH) to the azimuth detection circuit 37, with respect to which an azimuth detection (azimuth estimation) shall be performed. In other words, if a pair exists at a specific frequency point on one CH, then the data at the same frequency point on another CH will also be utilized, in conjunction with the data on the one CH, as complex number data for the azimuth detection. As this complex number data, either one of the ascent and the descent may be used, or both of the ascent and the descent may be used.

The azimuth detection circuit 37 detects the azimuth of the target, and outputs information of the detection result to the target establishment circuit 38. In the present embodiment, the azimuth detection circuit 37 detects the azimuth of the target by using a maximum likelihood estimation technique (which is a high resolution algorithm), based on complex amplitude data from the beam elements $1b_1$ to $1b_M$.

The target establishment circuit 38 establishes the target by using the distance r, relative velocity v, and frequency point having been output from the pair establishment circuit 36 and the azimuth (angle) of the target having been detected by the azimuth detection circuit 37.

Figure 15:
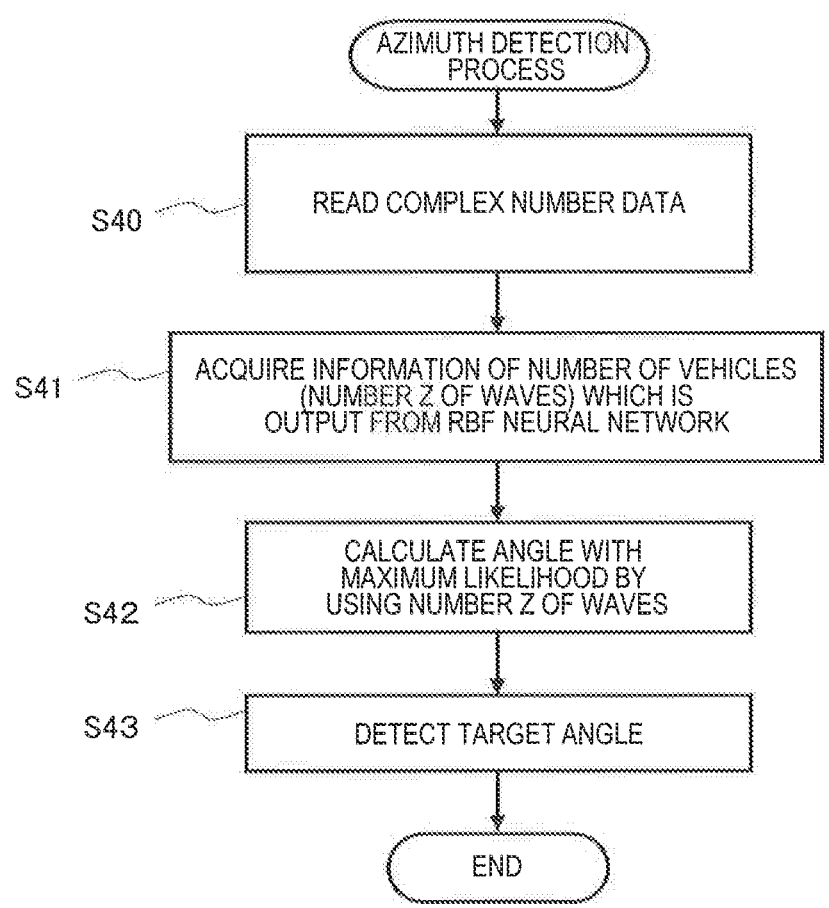
FIG. 15 is a flowchart showing a detailed procedure of an azimuth detection process based on maximum likelihood estimation by an azimuth detection circuit 37 in an arriving wave estimation circuit AU.

FIG. 15 shows the details of an azimuth detection process based on maximum likelihood estimation, which is performed by the azimuth detection circuit 37 in the arriving wave estimation circuit AU.

First, the azimuth detection circuit 37 generates a steering vector based on the reception signals of reflected waves from a target, and calculates likelihoods for directions of arrival of the reflected waves, thus to determine a direction of arrival that has the largest (highest) likelihood to be the target direction.

Specifically, for one of the beat frequencies with which target presence is associated, as extracted by the frequency decomposition circuit 32, the azimuth detection circuit 37 reads the complex number data on each channel from beam elements $1b_1$ to $1b_M$ (step S40).

In the processes of steps S41 to S43, the complex number data which was read in the process of step S40 is processed by a maximum likelihood estimation technique.

The maximum likelihood estimation technique itself is commonly used, and various known techniques are available (see, for example, Hiroyoshi YAMADA, Koubunkainou Touraiha Suiteihou no Kiso to Jissai (or "Basic and Practice of HighResolution Incoming Wave Estimation Method"), the Technical Committee on Antennas and Propagation of the Institute of Electronics, Information and Communication Engineers, October 2006 (hereinafter, "Non-Patent Document 1").

In outline, the azimuth detection circuit 37 uses the complex number data on each channel from beam elements $1b_1$ to $1b_M$ as inputs to an RBF neural network, and acquires an output from the RBF neural network, i.e., information of the number of vehicles (step S41). The number of vehicles thus obtained is synonymous with the number Z of waves.

Next, the azimuth detection circuit 37 calculates an angle that possesses the largest likelihood (maximum likelihood) (step S42).

Then, the azimuth detection circuit 37 detects a target angle (step S43).

Thus, the azimuth detection circuit 37 detects an azimuth (angle) of a target by a maximum likelihood estimation technique.

This will be described in further detail below.

<Computation by a Maximum Likelihood Estimation Technique, Under the Independent Multibeam Antenna Method of the Present Embodiment>

In the present embodiment, under an independent multibeam antenna method, a maximum likelihood estimation technique is applied in order to measure (detect) the azimuth of an object (reflecting object) which has reflected a beam signal.

The present embodiment utilizes the computation of a maximum likelihood estimation technique which is described in Non-Patent Document 1 (see Non-Patent Document 1).

Hereinafter, this will be specifically described.

In the description concerning Equation 9 to Equation 20, $x(t_n)$, $x_d^{(1)}(t_n)$, $a(\theta_d)$, $a(\theta_d^{(1)})$, $a(\theta)$, $s(t_n)$, $s^{(0)}(t_n)$, $s^{(1)}(t_n)$, and $\Theta^{(0)}$ each represent a vector. Moreover, what is obtained by substituting the left-hand side of Equation 17 ($=\theta_d^{(1)}$ with an overline added thereon) in the z of a(z) is also a vector.

In the description concerning Equation 9 to Equation 20, A, $A^{(0)}$, $A^{(1)}$, $C_d$, and $C_d^{(1)}$ each represent a matrix.

In the signal processing of the present embodiment, the problem of estimating parameters (reception signals and directions of arrival) is equivalent to the problem of minimizing the likelihood function FML expressed by Equation 9.

$$F_{ML} = \frac{1}{N_s}\sum_{n=1}^{N_s} |x(t_n) - As(t_n)|^2 \quad \text{Equation 9}$$

Herein, $x(t_n)$ is a vector of signals received in a multibeam, which is expressed by Equation 10. $t_n$ represents a point in time; $x_i(t_n)$ represents a reception signal associated with an $i^{th}$ beam at time $t_n$; i is an integer from 1 to M; and M is the total number of beams within the multibeam (an integer of 2 or more).

The superscript T in any vector or matrix means transposition.

n is an integer from 1 to $N_s$.

$N_s$ is the number of snapshots, which is an integer of 2 or more.

$$x(t_n)=[x_1(t_n)x_2(t_n)\ldots x_M(t_n)]^T \quad \text{Equation 10}$$

A is a direction matrix in which complex responses $a(\theta_d)$ of the multibeam of signals arriving from angles $\theta_d$ are arrayed, as is expressed by Equation 11.

d is an integer from 1 to D.

D represents the number of arrive waves, which is an integer of 2 or more. The number of arrive waves D is equal to the number Z of waves obtained at step S32 in FIG. 8.

If $\theta_d$ is known, $a(\theta_d)$ will be known through calculation or measurement.

$$A=[a(\theta_1)a(\theta_2)\ldots a(\theta_D)]^T \quad \text{Equation 11}$$

$s(t_n)$ is an arriving signal vector, which is expressed by Equation 12. $s_d(t_n)$ represents an arriving signal from a $d^{th}$ angle $\theta_d$ at time $t_n$.

For example, by the SAGE (Serial Analysis of Gene Expression) method, $\theta_d$ and $s(t_n)$ are determined from $x(t_n)$.

$$s(t_n)=[s_1(t_n)s_2(t_n)\ldots s_D(t_n)]^T \quad \text{Equation 10}$$

First, an initial value $\Theta^{(0)}$ of direction of arrival is arbitrarily set. This initial value $\Theta^{(0)}$ is expressed by Equation 13.

The superscript $^{(0)}$ added to each symbol indicates it being an initial value.

$$\Theta^{(0)}=[\theta_1^{(0)}\theta_2^{(0)}\ldots \theta_D^{(0)}]^T \quad \text{Equation 13}$$

An arriving signal $s^{(0)}(t_n)$ that corresponds to the initial value $\Theta^{(0)}$ having been set is estimated according to Equation 14.

The superscript H added to any matrix indicates it being an Hermitian transposition.

$$s^{(0)}(t_n)=(A^{(0)H}A^{(0)})^{-1}A^{(0)H}x(t_n) \quad \text{Equation 14}$$

Based on the initial value $\Theta^{(0)}$ and arriving signal $s^{(0)}(t_n)$, a maximum likelihood estimation value for $x(t_n)$ is calculated.

A maximum likelihood estimation value for a $d^{th}$ wave in an $l^{th}$ iteration is expressed by Equation 15.

The superscript (l) added to each symbol indicates an $l^{th}$ iteration. l=0 would mean that an arriving signal which was acquired through actual measurement is being used.

β is a nonnegative coefficient of a noise term. The convergence characteristics will vary depending on the value of β.

$$x_d^{(l)}(t_n)=a(\theta_d^{(l)})s_d^{(l)}(t_n)+\beta(x(t_n)-A^{(l)}s^{(l)}(t_n))\quad\text{Equation 15}$$

By using the maximum likelihood estimation value, a correlation matrix $C_d^{(l)}$ of $x_d^{(l)}(t_n)$ is estimated according to Equation 16.

$$C_d^{(l)} = \frac{1}{N_s}\sum_{n=1}^{N_s} x_d^{(l)}(t_n)x_d^{(l)}(t_n)^H \quad\text{Equation 16}$$

As mentioned above, $Cd^{(0)}$ at l=0 is a correlation matrix which is generated from the arriving signals acquired through actual measurement; however, any subsequent $Cd^{(l)}$ (l>0) is an estimated correlation matrix.

Through the following search, the arriving wave parameters are updated, according to Equation 17 and Equation 18.

$$\overline{\theta}_d^{(l)} = \underset{\theta}{\operatorname{argmax}} \frac{a(\theta)^H C_d^{(l)} a(\theta)}{a(\theta)^H a(\theta)} \quad\text{Equation 17}$$

$$\overline{s}^{(l)}(t_n) = \frac{a(\overline{\theta}_d^{(l)})^H x_d(t_n)}{a(\overline{\theta}_d^{(l)})^H a(\overline{\theta}_d^{(l)})} \quad\text{Equation 18}$$

According to Equation 19 and Equation 20, the direction matrix and the signal vector are updated by applying the updated parameters thereto.

$$A^{(l)}=[a(\theta_1^{(l)}) \ldots a(\theta_{d-1}^{(l)})a(\overline{\theta}_d^{(l)})a(\theta_{d+1}^{(l)}) \ldots a(\theta_D^{(l)})] \quad\text{Equation 19}$$

$$s^{(l)}(t_n)=[s_1^{(l)}(t_n) \ldots s_{d-1}^{(l)}(t_n)\overline{s}_d^{(l)}(t_n)s_{d+1}^{(l)}(t_n) \ldots s_D^{(l)}(t_n)]^T \quad\text{Equation 20}$$

If d<D, then d=d+1 is performed (i.e., 1 is added to d), and the process returns to Equation 7.

If d=D, then l=l+1 is performed (i.e., 1 is added to l), and the process returns to Equation 6.

This operation is repeated until the parameters have converged.

Through the above process, in each of the direction matrix and the signal vector, some components will converge to 0, while others will converge to a non-zero value. The component having the "non-zero value" represents the azimuth (angle) of the target.

The aforementioned construction of the signal processing circuit 30 shown in FIG. 14 is an example; other constructions may also be adopted.

For example, FIG. 16 shows a detailed hardware construction of a signal processing circuit 30a as a variant of the signal processing circuit 30. Hereinafter, differences between the construction of FIG. 16 and the exemplary construction shown in FIG. 14 will be described, while omitting description of any identical constituent element. In terms of hardware construction, the construction of FIG. 16 is identical to the construction of FIG. 14. The memory 31 is a RAM, for example. The neural network circuit NN and the arriving wave estimation circuit AU may as a whole be implemented by a single central processing circuit (a so-called CPU) or a processor. Alternatively, each of the neural network circuit NN and the arriving wave estimation circuit AU may be implemented by one or more CPUs.

The frequency decomposition circuit 32a converts the ascent beat signal and the descent beat signal from each antenna element into complex number data, and outputs frequency points indicating these beat frequencies and the complex number data to the peak detection circuit 33a.

In addition, the frequency decomposition circuit 32a outputs corresponding complex number data for each of the ascent region and the descent region to the azimuth detection circuit 37a. This complex number data represents a target group for each of the ascent region and the descent region (i.e., a beat frequency(s) having a peak(s) in the ascent region or the descent region).

The peak detection circuit 33a detects peak values in the ascent region and the descent region as well as the frequency points at which those peak values exist, and output the frequency points to the frequency decomposition circuit 32a.

The azimuth detection circuit 37a detects the azimuth of a target, and outputs information of the detection result to the target establishment circuit 38a. In the present embodiment, based on the information of the number Z of waves from the neural network circuit NN and on the complex amplitude data from the beam elements $1b_1$ to $1b_M$, the azimuth detection circuit 37a detects the azimuth of a target by using a maximum likelihood estimation technique, which is a high resolution algorithm.

Moreover, the azimuth detection circuit 37a detects angles θ for both the ascent region and the descent region, and outputs these to the peak combination circuit 34a in the form of azimuth tables. Herein, the azimuth tables are tables based on which to combine ascent peaks and descent peaks.

As a specific example, the azimuth table for the ascent region retains angle 1, angle 2, . . . , and a frequency point f in associated with each target group. For example, target group 1 is associated with t1_ang1 (angle 1), t1_ang2 (angle 2), and f1 (frequency point). Target group 2 is associated with t2_ang1 (angle 1), t2_ang2 (angle 2), and f2 (frequency point). Each subsequent target group similarly follows.

The azimuth table for the descent region retains angle 1, angle 2, . . . , and a frequency point f in associated with each target group. For example, target group 1 is associated with t1_ang1 (angle 1), t1_ang2 (angle 2), and f1 (frequency point). Target group 2 is associated with t2_ang1 (angle 1), t2_ang2 (angle 2), and f2 (frequency point). Each subsequent target group similarly follows.

By using the information of the azimuth tables output from the azimuth detection circuit 37a, the peak combination circuit 34a detects each combination that contains similar angles, and outputs information concerning combinations of ascent beat frequencies and descent beat frequencies (which herein is the beat frequency information) to the distance/velocity detection circuit 35a.

The distance/velocity detection circuit 35a computes a distance r from a target, based on a value which is obtained by taking a sum of each consecutively-incoming combination of an ascent beat frequency and a descent beat frequency, according to a predetermined formula (which can be any generic formula, for example; the description thereof is omitted).

Also, the distance/velocity detection circuit 35a computes a relative velocity v of the target, based on a difference between the ascent beat frequency and the descent beat frequency in each consecutively-incoming combination, according to a predetermined formula (which can be any generic formula, for example; the description thereof is omitted).

Herein, the distance/velocity detection circuit 35a calculates the distance and relative velocity values from each combination of ascent beat frequencies and descent beat frequencies.

The target establishment circuit 38a decides on a certain pair(s) of ascent peaks and descent peaks, thus establishing a target(s).

The signal processing circuit 8a of this second exemplary construction adopts a procedure in which target azimuths are first detected based on ascent peak values and descent peak values, and then the ascent peak values and descent peak values are combined. In another exemplary construction, ascent peak values and descent peak values may first be combined, and then a target azimuth(s) may be detected based on the combined peak values.

The variant signal processing circuit 30a shown in FIG. 16 also operates in accordance with the flowchart shown in FIG. 15, and thus description of its processing will be omitted.

Next, another variant of the vehicle travel controlling apparatus will be described.

Figure 17:
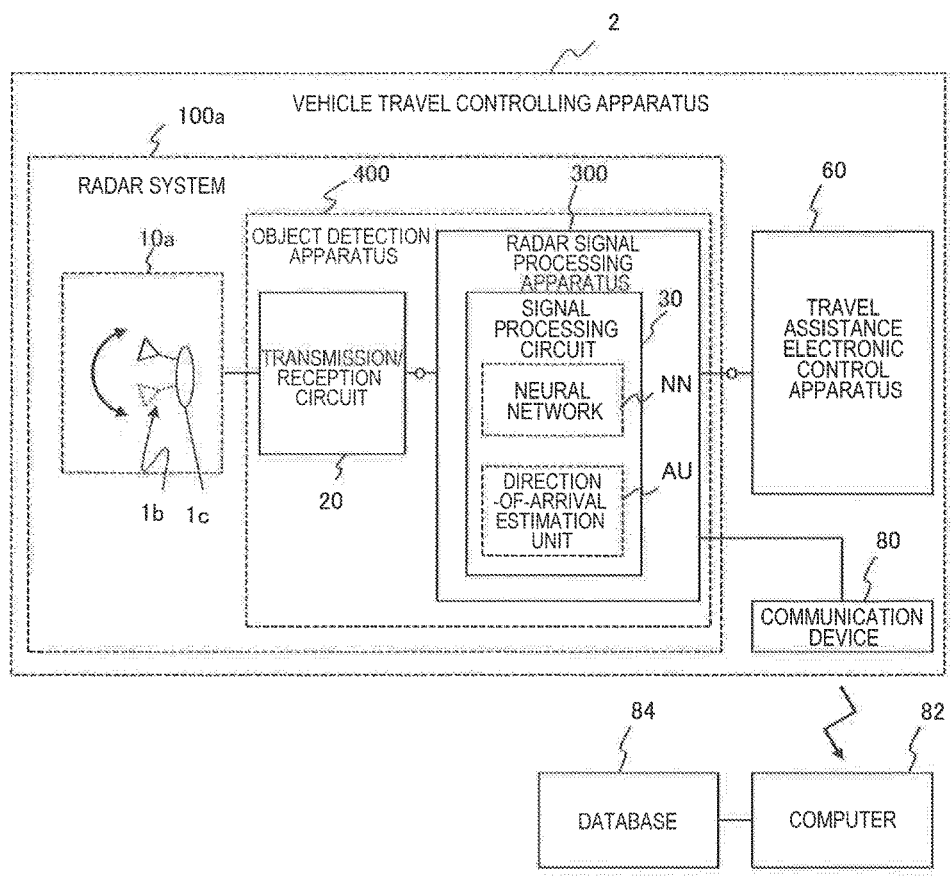
FIG. 17 is a diagram showing the construction of a vehicle travel controlling apparatus 2 as a variant of the vehicle travel controlling apparatus 1 (FIG. 9).

FIG. 17 shows a construction of a vehicle travel controlling apparatus 2 as a variant of the vehicle travel controlling apparatus 1 (FIG. 9). The difference between the vehicle travel controlling apparatus 2 and the vehicle travel controlling apparatus 1 (FIG. 9) lies in the construction of the antenna apparatus. Specifically, a radar system 100a is incorporated in the vehicle travel controlling apparatus 2, and an antenna apparatus 10a which is included in the radar system 100a differs in construction from the antenna apparatus 10 included in the radar system 100 of the vehicle travel controlling apparatus 1 (FIG. 9). The construction is otherwise identical, with the corresponding description being omitted.

The independent multibeam antenna MA in the antenna apparatus 10 of the vehicle travel controlling apparatus 1 (FIG. 9) has been illustrated as including the dielectric lens 1a and the plurality of antenna elements (beam elements) 1b in order to confer directivity to the beams to be transmitted and/or the beams to be received.

On the other hand, the independent multibeam antenna in the antenna apparatus 10a of the vehicle travel controlling apparatus 2 includes one beam element 1b, which has directivity, and an actuator 1c which alters the position of the beam element 1b. No dielectric lens is provided in the antenna apparatus 10a. The antenna apparatus 10a is able to adjust the direction of a beam which is emitted from the beam element 1b by driving the beam element 1b with the actuator 1c. By controlling the driving of the actuator 1c, the object detection apparatus 400 is able to emit beams in desired directions.

Although FIG. 17 illustrates one beam element 1b and one actuator 1c, this is an example. A plurality of beam elements and a corresponding plurality of actuators may be provided. With such construction, too, some or all of the antenna elements may be mechanically driven to switch the directivity direction of a beam to be received, thus being able to create or receive more beams than there are antenna elements.

Figure 18:
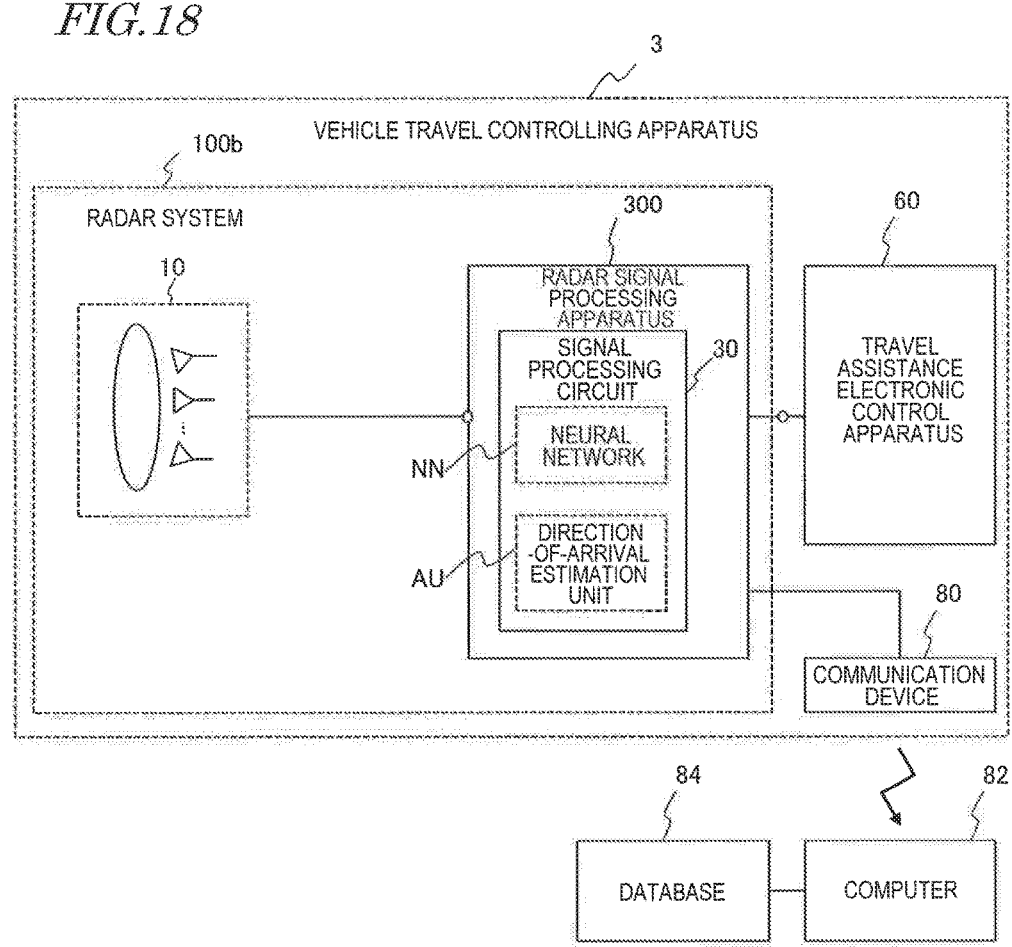
FIG. 18 is a diagram showing the construction of a vehicle travel controlling apparatus 3 as a further variant of the vehicle travel controlling apparatus 1 (FIG. 9).

FIG. 18 shows the construction of a vehicle travel controlling apparatus 3 as a variant of the vehicle travel controlling apparatus 1 (FIG. 9). The difference between the vehicle travel controlling apparatus 1 (FIG. 9) and the vehicle travel controlling apparatus 3 is whether the transmission/reception circuit 20 exists or not; the vehicle travel controlling apparatus 3 lacks the transmission/reception circuit 20. The radar signal processing apparatus 300 in a radar system 100b of the vehicle travel controlling apparatus 3 straightforwardly receives the reception signals which are output from the antenna apparatus 10.

Accordingly, the neural network NN in the radar signal processing apparatus 300 needs to have completed learning by using the reception signals which are output from the antenna apparatus 10 as they are.

The arriving wave estimation circuit AU in the radar signal processing apparatus 300 estimates the directions of arrival of the arriving waves by using the reception signals as they are.

FIG. 9, FIG. 17, and FIG. 18 show implementations where the radar system is mounted in the vehicle to define a part of the vehicle travel controlling apparatus 1. In the signal processing circuit 30 in the radar system, the neural network NN which has performed learning as described above is established; therefore, without estimating the azimuth of a preceding vehicle by using any conventional algorithm that may require an excessive computation amount, it is possible to grasp a spatial distribution of preceding vehicles. Moreover, once the number of preceding vehicles becomes identified, it is possible to estimate the azimuth(s) of the preceding vehicle(s) with a high resolution by using a maximum likelihood estimation technique. After a spatial distribution of preceding vehicles is determined by the neural network NN, travel assistance such as autocruising will become possible without having to determine accurate estimation values of azimuths of the preceding vehicles.

Note that the radar systems according to various preferred embodiments of the present invention may, without being limited to the implementation where it is mounted in the driver's vehicle, be used while being fixed on the road or a building.

Figure 19:
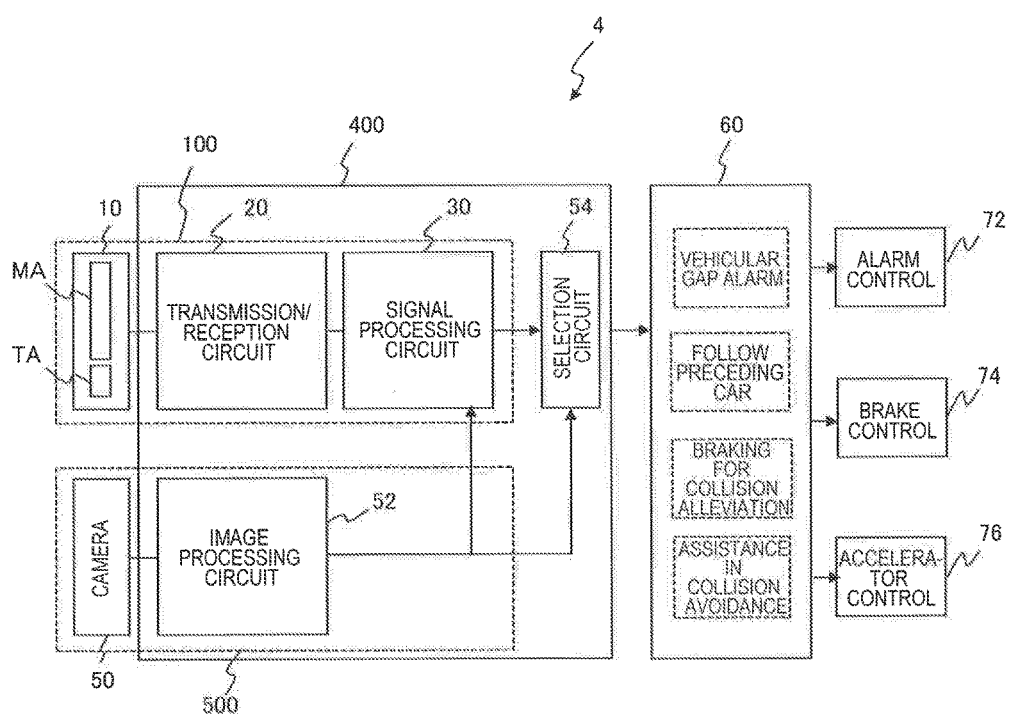
FIG. 19 is a diagram showing the construction of a vehicle travel controlling apparatus 4 including a radar system 100 (FIG. 9) and an onboard camera system 500.

Next, FIG. 19 is referred to. The vehicle travel controlling apparatus 4 of the present preferred embodiment shown in FIG. 19 includes a radar system 100 (FIG. 9) and an onboard camera system 500. Instead of the radar system 100 (FIG. 9), the radar system 100a (FIG. 17) or the radar system 100b (FIG. 18) may be adopted. Hereinafter, a vehicle travel controlling apparatus 4 including the radar system 100 (FIG. 9) will be described.

In its fundamental construction, the radar system 100 preferably includes an antenna apparatus 10, a transmission/reception circuit 20 which is connected to the antenna apparatus 10, and a signal processing circuit 30. In the signal processing circuit 30, a learned neural network NN has been established as shown in FIG. 9, and a direction-of-arrival estimation circuit AU is provided.

The onboard camera system 500 includes an onboard camera 50 which is mounted in a vehicle, and an image processing circuit 52 which processes an image or video that is acquired by the onboard camera 50.

The vehicle travel controlling apparatus 4 includes an object detection apparatus 400 which is connected to the antenna apparatus 10 and the onboard camera 50, and a travel assistance electronic control apparatus 60 which is connected to the object detection apparatus 400. The object detection apparatus 400 includes a transmission/reception circuit 20 and an image processing circuit 52, in addition to the above-described signal processing circuit 30. The object detection apparatus 400 in the present preferred embodiment detects a target on the road or near the road, by using not only the information is obtained by the radar system 100 but also the information which is obtained by the image processing circuit 52. For example, while the driver's vehicle is traveling in one of two or more lanes of the same direction, the image processing circuit 52 can distinguish which lane the driver's vehicle is traveling in, and supply that result of distinction to the signal processing circuit 30. When a spatial distribution of preceding vehicles is to be recognized by using the neural network NN, the signal processing circuit 30 is able to provide more reliable information concerning a spatial distribution of preceding vehicles by referring to the information from the image processing circuit 30.

Note that the onboard camera system 500 is an example of a system or detector that identifies which lane the driver's vehicle is traveling in. The lane position of the driver's vehicle may be identified by any other system or detector. For example, by utilizing an ultra-wide band (UWB) technique, it is possible to identify which one of a plurality of lanes the driver's vehicle is traveling in. It is widely known that the ultra-wide band technique is applicable to position measurement and/or radar. By using the ultra-wide band technique, it becomes possible to identify distance from a guardrail on the road shoulder, or from the median strip. The width of each lane is predefined based on each country's law or the like. By using such information, it becomes possible to identify where the lane in which the driver's vehicle is currently traveling is. Note that the ultra-wide band technique is an example. A radio wave based on any other wireless technique may be used. Moreover, a laser radar may be used.

The antenna apparatus 10 may be a generic millimeter wave radar antenna for onboard use. In the example of FIG. 19, a transmission antenna TA is shown in the antenna apparatus 10. The transmission antenna TA in the present preferred embodiment emits a millimeter wave as a transmission wave ahead of the vehicle. A portion of the transmission wave is reflected off a target which is typically a preceding vehicle, whereby a reflected wave occurs from the target being a wave source. A portion of the reflected wave reaches the array antenna (reception antenna) AA as an arriving wave. Each of the plurality of antenna elements of the independent multibeam antenna MA outputs a reception signal in response to one or plural arriving waves. In the case where the number of targets functioning as wave sources of reflected waves is K (where K is an integer of one or more), the number of arriving waves is K, but this number K of arriving waves is not known beforehand. By performing the aforementioned signal processing utilizing a neural network, it becomes possible to estimate the number K of arriving waves with a smaller computation amount than conventionally possible.

The antenna apparatus 10 in the present preferred embodiment preferably is disposed on the front surface of the vehicle, so as to be able to detect targets that are ahead of the vehicle. The number and positions of antenna apparatuses 10 to be disposed on the vehicle are not limited to any specific number or specific positions. The antenna apparatus 10 may be disposed on the rear surface of the vehicle so as to be able to detect targets that are behind the vehicle. Moreover, a plurality of antenna apparatuses 10 may be disposed on the front surface and the rear surface of the vehicle. The may be disposed inside of the vehicle. Especially in the case where the respective antenna elements of the independent multibeam antenna MA are horn antennas, the array antenna with such antenna elements may be situated inside of the vehicle, where there is ample space. In the case where the independent multibeam antenna MA and the transmission antenna TA are mounted on the same vehicle, the independent multibeam antenna MA and the transmission antenna TA may be distanced by about 100 millimeters or more, for example.

The signal processing circuit 30 receives and processes the reception signals from the independent multibeam antenna MA. This process encompasses inputting the reception signals to the neural network NN, or alternatively, generating a secondary signal(s) from the reception signals and inputting the secondary signal(s) to the neural network NN. The neural network NN is configured or programmed to perform computation using the reception signals or secondary signal(s) and learned data, and output a signal indicating the number of arriving waves (number Z of waves). Based on a signal indicating the number Z of waves, the direction-of-arrival estimation circuit AU included in the signal processing circuit 30 uses a maximum likelihood estimation technique to estimate the azimuth(s) of the preceding vehicle(s). The details of the individual processes have already been described above.

In the example of FIG. 19, a selection circuit 54 which receives the signal being output from the signal processing circuit 30 and the signal being output from the image processing circuit 52 is provided in the object detection apparatus 400. The selection circuit 54 allows one or both of the signal being output from the signal processing circuit 30 and the signal being output from the image processing circuit 52 to be fed to the travel assistance electronic control apparatus 60.

Based on predefined conditions, the travel assistance electronic control apparatus 60 having received the position information of a preceding object from the object detection apparatus 400 performs control to make the operation safer or easier for the driver who is driving the driver's vehicle, in accordance with the distance and size indicated by the object position information, the velocity of the driver's vehicle, road surface conditions such as rainfall, snowfall or clear weather, or other conditions. For example, if the object position information indicates that no object has been detected, the travel assistance electronic control apparatus 60 may send a control signal to the accelerator control circuit or controller 76 to increase speed up to a predefined velocity, thus controlling the accelerator control circuit or controller 76 to make an operation that is equivalent to stepping on the accelerator pedal.

In the case where the object position information indicates that an object has been detected, if it is determined to be at a predetermined distance from the driver's vehicle, the travel assistance electronic control apparatus 60 controls the brakes via the brake control circuit or controller 74 through a brake-by-wire construction or the like. In other words, it makes an operation of decreasing the velocity to maintain a constant vehicular gap. Upon receiving the object position information, the travel assistance electronic control apparatus 60 sends a control signal to the alarm control circuit or controller 72 so as to control lamp illumination or control audio through a loudspeaker which is provided within the vehicle, so that the driver is informed of the nearing of a preceding object. Upon receiving object position information including a spatial distribution of preceding vehicles, the travel assistance electronic control apparatus 60 may, if the traveling velocity is within a predefined range, automatically make the steering wheel easier to operate to the right or left, or control the hydraulic pressure on the steering wheel side so as to force a change in the direction of the wheels, thus providing assistance in collision avoidance with respect to the preceding object.

The aforementioned object detection apparatus 400 can be implemented by a generic computer operating based on a program which causes it to function as the respective constituent elements above. Such a program may be distributed through telecommunication lines, or distributed in a form written to a semiconductor memory or a storage medium such as a CD-ROM.

The object detection apparatus 400 may be arranged so that, if a piece of object position information which was being continuously detected by the selection circuit 54 for a while in the previous detection cycle but which is not detected in the current detection cycle becomes associated with a piece of object position information from a camera-detected video indicating a preceding object, then continued tracking is chosen, and object position information from the signal processing circuit 30 is output with priority.

An exemplary specific construction and an exemplary operation for the selection circuit 54 to make a selection between the outputs from the signal processing circuit 30 and the image processing circuit 52 are disclosed in Japanese Laid-Open Patent Publication No. 2014-119348. The entire disclosure thereof is incorporated herein by reference.

Figure 20:
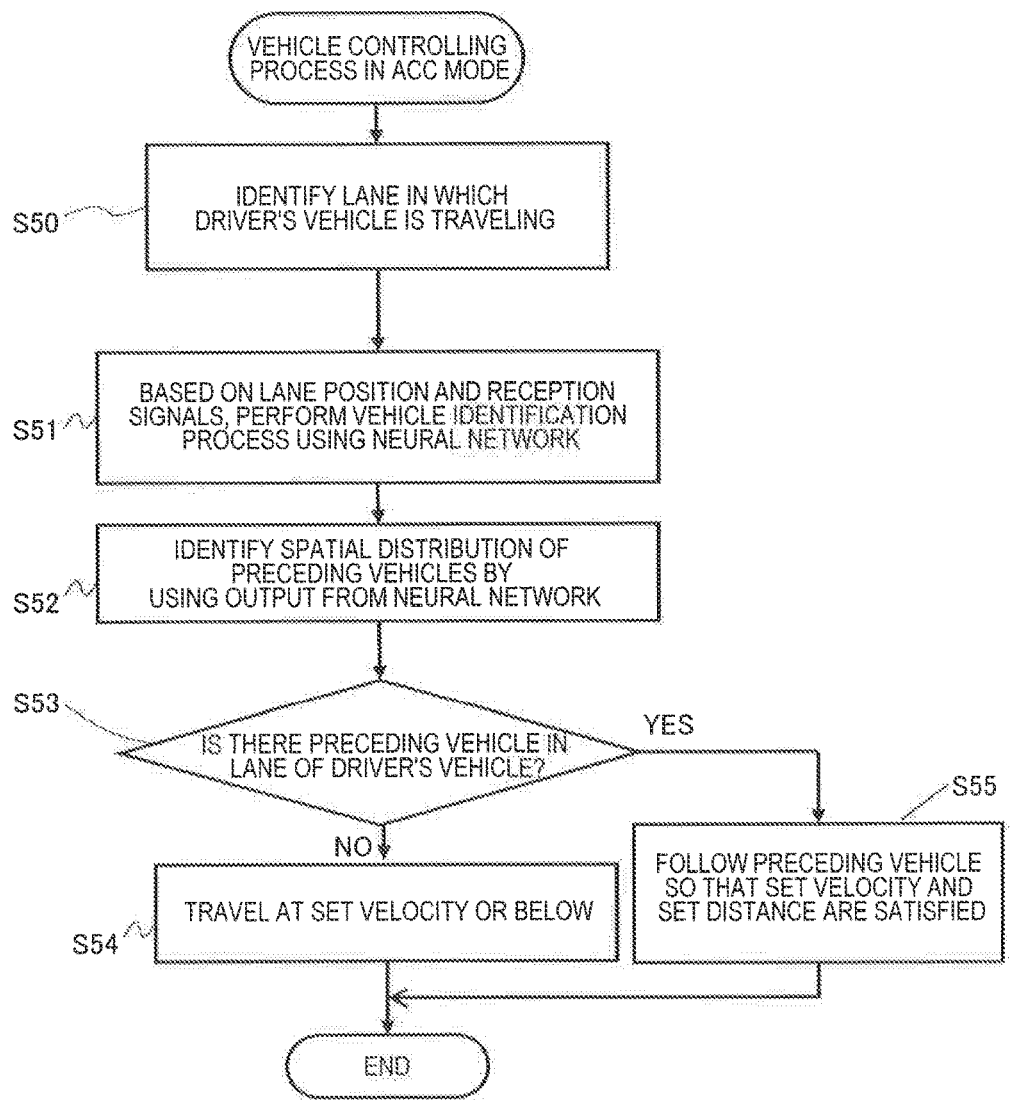
FIG. 20 is a flowchart showing a processing procedure by the vehicle travel controlling apparatus 1 (FIG. 19).

FIG. 20 is a flowchart showing a processing procedure by the vehicle travel controlling apparatus 1 (FIG. 19). As an instance, vehicle control in adaptive cruise control mode will be described.

At step S50, by using the onboard camera system 500, the vehicle travel controlling apparatus 1 identifies a lane in which the driver's vehicle is currently traveling. As described earlier, a radio wave may also be utilized in identifying a lane, instead of or in addition to using the onboard camera system 500.

At step S51, based on lane position information which is output from the image processing circuit 52 of the onboard camera system 500 and reception signals which are output from the transmission/reception circuit 20, the signal processing circuit 30 performs a vehicle identification process utilizing the neural network NN.

At step S52, the signal processing circuit 30 identifies a spatial distribution of preceding vehicles by using an output from the neural network NN.

At step S53, the signal processing circuit 30 determines whether any preceding vehicles exist in lane of the driver's vehicle. If any preceding vehicle exists, the process proceeds to step S54; if no preceding vehicle exists, the process proceeds to step S55.

At step S54, the travel assistance electronic control apparatus 60 instructs the brake control circuit or controller 74 to control the brakes, and/or instructs the accelerator control circuit or controller 76 to control the amount of injected fuel. Thus, the travel assistance electronic control apparatus 60 causes the driver's vehicle to travel at a set velocity or below.

At step S55, too, the travel assistance electronic control apparatus 60 instructs the brake control circuit or controller 74 to control the brakes, and/or instructs the accelerator control circuit or controller 76 to control the amount of injected fuel. Thus, the travel assistance electronic control apparatus 60 causes the driver's vehicle to follow the preceding vehicle, while satisfying a set velocity and a set distance.

Thus, specific preferred embodiments according to the present disclosure have been described above.

The above description illustrates examples where the number of preceding vehicles that are traveling abreast of each other at an identical distance from the driver's vehicle and the lanes in which the preceding vehicles are traveling are directly identified, and that information is utilized in a vehicle controlling method under adaptive cruise control mode.

Hereinafter, another example of utilizing a result of identifying, by two kinds of methods, the number of preceding vehicles that are traveling abreast of each other at an identical distance from the driver's vehicle and the lanes in which the preceding vehicles are traveling will be described.

Figure 21:
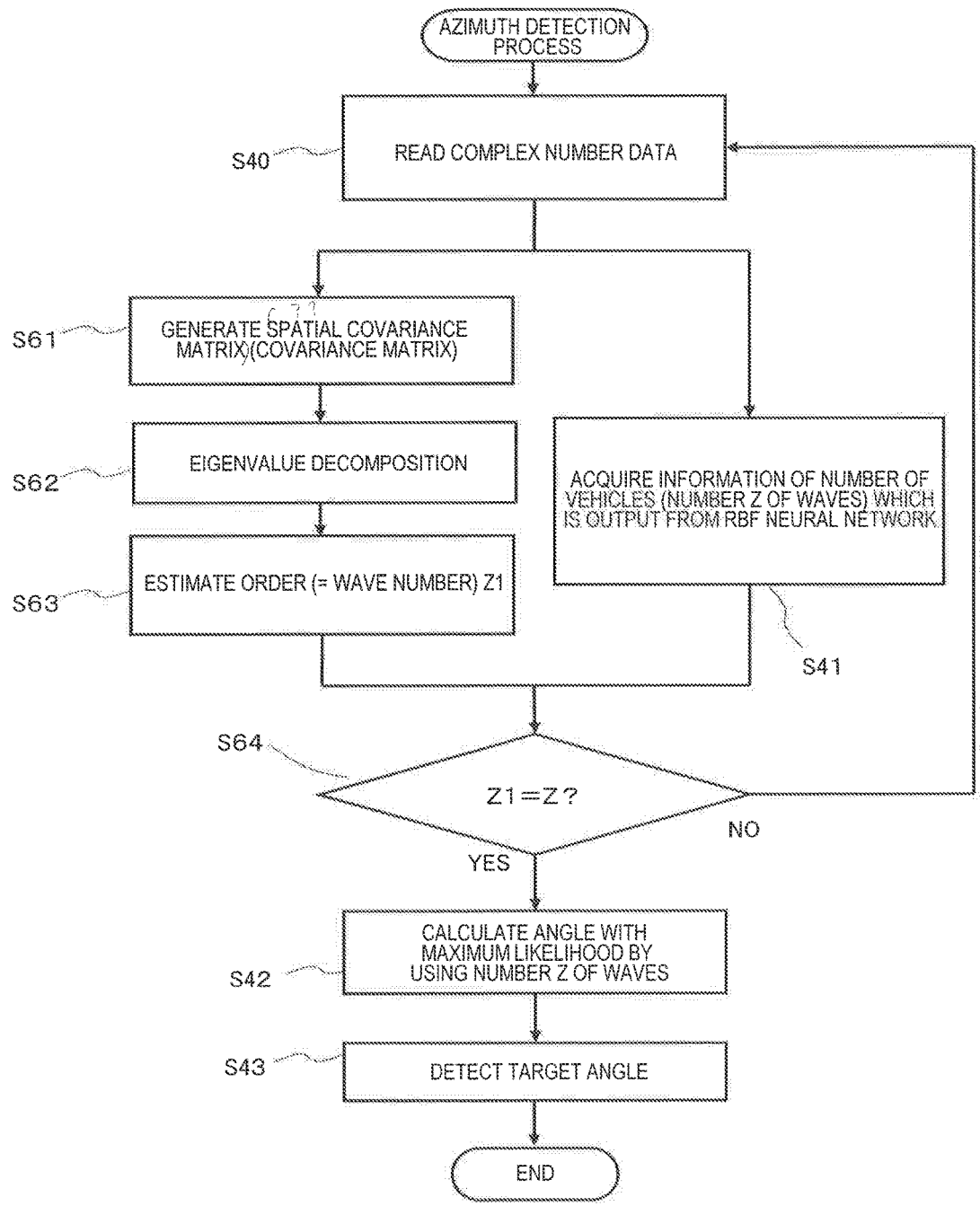
FIG. 21 is a flowchart showing the procedure of a process of respectively acquiring number-of-waves information by two different methods, and calculating an azimuth (angle) only when they match.

FIG. 21 shows a procedure of a process in which two different methods are used to respectively acquire number-of-waves information, and an azimuth (angle) is calculated only when they match.

The processing of FIG. 21 is based on the processing of FIG. 15, with the additional processes of steps S61 to S64. In FIG. 21, identical processes to those in FIG. 15 are denoted by like step numbers, with their descriptions being omitted.

At step S61, the azimuth detection circuit 37 generates a spatial covariance matrix (covariance matrix) by using complex number data on each channel from beam elements $1b_1$ to $1b_M$.

Now, the reason why it is possible to generate a spatial covariance matrix even in the case of using the independent multibeam antenna MA will be described. Unlike an array antenna, the independent multibeam antenna MA is not expected to be such that the electromagnetic waves from one wave source will be received at all of the beam elements $1b_1$ to $1b_M$ in practice. In other words, not all signals received by the beam elements $1b_1$ to $1b_M$ at a given point in time are correlated. Therefore, what would be of question is whether a matrix will be established that qualifies as a spatial covariance matrix (covariance matrix).

For example, any two adjacent beam elements in the independent multibeam antenna MA are designed with such sensitivities that they will redundantly receive an electromagnetic wave, in an overlapping manner. Although FIG. 11 above has been illustrated as an example of emitting five beams, the same is also true of the characteristics when receiving as many beams. For example, with reference to FIG. 11, assume a beam element $1b4$, which mainly receives the signal 1004 of the fourth beam, and a beam element $1b5$, which mainly receives the signal 1005 of the fifth beam. As shown in FIG. 11, at the angle at which the gain of the signal 1004 of the fourth beam has a peak, for example, the signal 1005 of the fifth beam has some gain. Similarly, at the angle at which the gain of the signal 1005 of the fifth beam has a peak, the signal 1004 of the fourth beam has some gain. This indicates that both beam elements $1b_4$ and $1b_5$ are able to detect the signal 1004 of the fourth beam as well as the signal 1005 of the fifth beam. In another perspective, when a beam impinges on the independent multibeam antenna MA at an intermediate angle between the azimuth angle of the signal 1004 of the fourth beam and the azimuth angle of the signal 1005 of the fifth beam, the beam elements $1b_4$ and $1b_5$ will both receive that signal.

In other words, there is correlation between the signals which are respectively received at the beam elements $1b_4$ and $1b_5$. Among all beam elements, correlation exists between the signals received by some beam elements, whereby it becomes possible to derive a spatial covariance matrix.

At step S62, the azimuth detection circuit 37 applies eigenvalue decomposition to the spatial covariance matrix.

Eigenvalue decomposition of a matrix involves decomposing the matrix into a diagonal matrix having eigenvalues as its diagonal components. When a spatial covariance matrix is subjected to eigenvalue decomposition, eigenvalues and eigenvectors of the spatial covariance matrix are obtained.

At step S63, the azimuth detection circuit 37 uses the decomposed eigenvalues to identify an order (degree) Z1. The order Z1 indicates the number of arriving waves, i.e., the number of waves (hereinafter referred to as the "number Z1 of waves"). The signal indicating the number of arriving waves is derived as a signal indicating the number of eigenvalues, among the eigenvalues of the spatial covariance matrix, that have values equal to or greater than a predetermined value which is defined based on thermal noise (signal space eigenvalues).

At step S64, the azimuth detection circuit 37 determines whether the number Z1 of waves determined at step S63 and the number Z of waves determined at step S41 match each other. If they match, the process proceeds to step S42; if they do not match, the process returns to step S40. After returning to step S40, the azimuth detection circuit 37 applies the aforementioned process of FIG. 21 to another set of complex number data which is obtained from a new set of reception signals.

In the above variant, a result of the vehicle identification process using a neural network according to the present disclosure is acquired as an estimation value of the number of arrive waves, and another estimation value of the number of arrive waves is also determined by utilizing a spatial covariance matrix. If both estimation values match, the matching estimation value is utilized as information of the number of arrive waves. Through such auxiliary use of the estimation value of the number of arrive waves obtained by using a spatial covariance matrix, the accuracy of neural-network based estimation of the number of arrive waves using is improved. This will contribute to an improved reliability for the angle(s) indicating the direction(s) of arrival of the arriving wave(s) that is obtained by using the information of the number of waves.

The above description of various preferred embodiments of the present invention illustrates that the radar system is provided at the front of a vehicle, in order to obtain information indicating a spatial distribution of preceding vehicles. However, the radar system may be provided at the rear of a vehicle. In that case, the radar system will output information indicating a spatial distribution of following vehicles, i.e., those traveling behind the driver's vehicle. As used herein, a "following vehicle" is traveling in the same lane as the lane in which the driver's vehicle is traveling, or in an adjoining lane containing traffic of the same direction. It is important to know a spatial distribution of following vehicles when changing lanes.

Although the present specification chiefly illustrates situations where a preceding (or following) vehicle and the driver's vehicle are both "traveling", this does not literally require that both of the preceding (or following) vehicle and the driver's vehicle are in motion at the moment; for example, the preceding vehicle may happen to be stationary while the driver's vehicle is in motion, or the driver's vehicle may happen to be stationary while the following vehicle is in motion.

Preferred embodiments of the present invention are applicable to a radar system for onboard use which requires the process of recognizing a spatial distribution of preceding vehicles and/or following vehicles, for example. Furthermore, preferred embodiments of the present invention are applicable to a preprocessing for the SAGE method or other maximum likelihood estimation techniques, where a recognized spatial distribution of preceding vehicles and/or following vehicles is utilized as information of the number of arriving waves.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2015-015791 filed on Jan. 29, 2015, the entire contents of which are hereby incorporated by reference.

What is claimed is:
1. A radar system comprising:
an independent multibeam antenna which outputs at least one reception signal in response to at least one arriving wave; and
a signal processing circuit in which a learned neural network has been established; wherein
the signal processing circuit includes:
a neural network circuit in which the learned neural network is implemented, and
an arriving wave estimation circuit to estimate an angle or angles indicating a direction or directions of arrival of the at least one arriving wave and output a signal indicating a result of estimation; and
the signal processing circuit:
receives the at least one reception signal from the independent multibeam antenna;
inputs the at least one reception signal or a secondary signal generated from the at least one reception signal, to the learned neural network;
performs, in the neural network circuit, computation by using the at least one reception signal or secondary signal and data of the learned neural network; and
outputs a signal indicating a number of the at least one arriving wave from the neural network, and
receives, in the arriving wave estimation circuit, the at least one reception signal or secondary signal, and the signal indicating a number of the at least one arriving wave from the neural network circuit.

2. The radar system of claim 1, wherein the independent multibeam antenna includes a lens or a reflector and a plurality of antenna elements.

3. The radar system of claim 1, wherein the independent multibeam antenna includes one or more antenna elements and an actuator to alter the position of the one or more antenna elements to achieve directivity control at least concerning beam reception, the actuator mechanically driving a part or all of the antenna elements so that the number of plural beams to be received in different directions is greater than the number of antenna elements.

4. The radar system of claim 1, wherein the signal processing circuit is configured to estimate a direction or directions of arrival of the at least one arriving wave with a maximum likelihood estimation technique by using the signal indicating the number of the at least one arriving wave, and output an estimated value.

5. A radar system comprising:
an independent multibeam antenna which includes a plurality of antenna elements and outputs a plurality of reception signals in response to at least one arriving wave; and a signal processing circuit in which a learned neural network has been established; wherein
the signal processing circuit:
receives the plurality of reception signals;
inputs a unit vector generated from the plurality of reception signals, to the neural network;
performs computation by using the unit vector, and data of the learned neural network; and
outputs a signal indicating a number of the at least one arriving wave from the neural network;
the signal processing circuit is configured to estimate a direction or directions of arrival of the at least one arriving wave with a maximum likelihood estimation technique by using the signal indicating the number of the at least one arriving wave, and output an estimated value;
the signal processing circuit further includes
a neural network circuit in which the neural network is implemented, and
an arriving wave estimation circuit to estimate an angle or angles indicating the direction or directions of arrival of the at least one arriving wave and output a signal indicating a result of estimation; and
the arriving wave estimation circuit receives the unit vector and the signal indicating the number of the at least one arriving wave from the neural network circuit, and performs computation of the maximum likelihood estimation technique by using the number of the at least one arriving wave and complex amplitude data based on the unit vector, thereby detecting angles indicating the direction or directions of arrival of the at least one arriving wave.

6. The radar system of claim 5, wherein,
the neural network circuit and the arriving wave estimation circuit receive a beat signal generated based on the plurality of reception signals; and
the arriving wave estimation circuit is configured to
generate a covariance matrix from the complex amplitude data,
apply eigenvalue decomposition to the covariance matrix, and
calculate an angle that possesses a largest likelihood from at least one eigenvalue and at least one eigenvector.

7. The radar system of claim 6, wherein,
the arriving wave estimation circuit is configured to
calculate distance and relative velocity of a wave source or wave sources of the at least one arriving wave by using a frequency component of the beat signal, and
establish at least one of the wave sources at least based on the distance and relative velocity, and the angle that possesses the largest likelihood.

8. The radar system of claim 5, wherein
the radar system is mounted in a driver's vehicle; and
the signal processing circuit outputs the signal indicating the number of the at least one arriving wave or a signal indicating a spatial distribution pattern of preceding vehicles, as a signal indicating a number of preceding vehicles ahead of the driver's vehicle, where the preceding vehicles are one preceding vehicle or a plurality of the preceding vehicles that are abreast of each other.

9. The radar system of claim 8, wherein as a signal indicating a spatial distribution pattern of the one preceding vehicle or the plurality of preceding vehicles that are abreast of each other, the signal processing circuit outputs a signal indicating whether or not at least one of the preceding vehicles exists in a driver's lane in which the driver's vehicle is travelling and in a lane adjacent to the driver's lane.

10. The radar system of claim 9, wherein the signal processing circuit outputs a signal indicating a spatial distribution pattern of the one preceding vehicle or the plurality of preceding vehicles that are abreast of each other in terms of numerical values.

11. The radar system of claim 9, wherein the signal processing circuit operates in an output mode of outputting a signal indicating a spatial distribution pattern of the one preceding vehicle or the plurality of preceding vehicles that are abreast of each other without estimating a direction or directions of arrival of the at least one arriving wave.

12. The radar system of claim 11, wherein
the signal processing circuit further operates in an estimation mode of estimating a direction or directions of arrival of the at least one arriving wave without using the signal indicating the number of the least one arriving wave; and
the signal processing circuit acquires a spatial distribution pattern of the one preceding vehicle or the plurality of preceding vehicles in the output mode, and thereafter performs processing in the estimation mode by utilizing the spatial distribution pattern of the one preceding vehicle or the plurality of preceding vehicles.

13. The radar system of claim 9, wherein the learned neural network completes learning in a situation where other vehicles respectively exist in two adjoining lanes of a same direction as a direction of travel of the driver's vehicle and in a situation where none of the other vehicles exist, by using the plurality of reception signals obtained in each situation and by using a training signal indicating a spatial distribution of vehicles in the lanes in each situation.

14. The radar system of claim 8, wherein the signal processing circuit estimates a direction or directions of arrival of the at least one arriving wave based on the plurality of reception signals.

15. The radar system of claim 14, wherein the signal processing circuit selectively operates in one of:
a first mode of estimating a direction or directions of arrival of the at least one arriving wave by using the signal indicating the number of the at least one arriving wave output from the learned neural network; and
a second mode of estimating a direction or directions of arrival of the at least one arriving wave without using the signal indicating the number of the at least one arriving wave.

16. The radar system of claim 15, wherein the second mode estimates a direction or directions of arrival of the at least one arriving wave by performing an algorithm for direction-of-arrival estimation.

17. The radar system of claim 8, wherein
the signal processing circuit uses a camera or radio wave to identify a lane in which the driver's vehicle is traveling;
the learned neural network has been established in a lane-by-lane manner for predefined lanes for the driver's vehicle to travel in; and
the signal processing circuit selects the learned neural network in accordance with the lane in which the driver's vehicle is traveling, and outputs a signal indicating a spatial distribution pattern of the one preceding vehicle or the plurality of preceding vehicles.

18. The radar system of claim 1, wherein the signal processing circuit detects at least one target based on the plurality of reception signals, and determines a distance to the at least one target and a relative velocity of the at least one target relative to the array antenna.

19. The radar system of claim 5, wherein the signal processing circuit is a programmable logic device.

20. The radar system of claim 19, wherein the signal processing circuit includes:
   a plurality of computation elements to perform the computation; and
   a plurality of memory elements storing the data of the learned neural network.

21. The radar system of claim 1, wherein the signal processing circuit includes:
   only one signal processing circuit to perform the computation; and
   a memory device storing the data of the learned neural network.

22. The radar system of claim 1, wherein the data of the learned neural network includes values of weights to be applied to inputs to nodes of the learned neural network.

23. A radar signal processing apparatus to be mounted in a driver's vehicle, the radar signal processing apparatus comprising:
   a first terminal to acquire, from an independent multibeam antenna which outputs at least one reception signal in response to at least one arriving wave, the at least one reception signal;
   a signal processing circuit in which a learned neural network has been established; and
   a second terminal to transmit a signal which is output from the signal processing circuit; wherein
   the signal processing circuit includes:
      a neural network circuit in which the learned neural network is implemented, and
      an arriving wave estimation circuit to estimate an angle or angles indicating a direction or directions of arrival of the at least one arriving wave and output a signal indicating a result of estimation; and
   the signal processing circuit:
      receives the at least one reception signal via the first terminal;
      inputs the at least one reception signal or a secondary signal generated from the at least one reception signal to the learned neural network;
      performs, in the neural network circuit, computation by using the at least one reception signal or secondary signal and data of the learned neural network;
      outputs a signal indicating a number of the at least one arriving wave; and
      receives, in the arriving wave estimation circuit, the at least one reception signal or secondary signal, and the signal indicating a number of the at least one arriving wave from the neural network circuit.

24. The radar signal processing apparatus of claim 23, wherein the signal processing circuit further outputs, as computed by using the at least one reception signal, a signal indicating a distance between a driver's vehicle and at least one preceding vehicle in a driver's lane and in a lane adjacent to the driver's lane, and a signal indicating a relative velocity of the at least one preceding vehicle.

25. A vehicle travel controlling apparatus to be mounted in a driver's vehicle, the vehicle travel controlling apparatus comprising:
   an independent multibeam antenna which outputs at least one reception signal in response to at least one arriving wave;
   the radar signal processing apparatus of claim 24; and
   an electronic control apparatus to perform adaptive cruise control of the driver's vehicle and control a velocity of the driver's vehicle by using signals being output from the radar signal processing apparatus and respectively indicating a distance, a relative velocity, and a number of the at least one arriving wave.

26. A vehicle travel controlling method comprising:
   acquiring at least one reception signal by using an independent multibeam antenna which outputs at least one reception signal in response to at least one arriving wave;
   inputting the at least one reception signal or a secondary signal generated from the at least one reception signal to a signal processing circuit in which a learned neural network has been established;
   performing computation in the signal processing circuit by using the at least one reception signal or secondary signal and data of the learned neural network;
   outputting a signal indicating a number of the at least one arriving wave from the learned neural network;
   by using the at least one reception signal, outputting signals respectively indicating distances between a driver's vehicle and at least one preceding vehicle in a driver's lane and in a lane adjacent to the driver's lane as corresponding to the at least one arriving wave and a relative velocity of the at least one preceding vehicle; and
   performing adaptive cruise control of the driver's vehicle by using the signals respectively indicating a distance, a relative velocity, and a number of the at least one arriving wave to control a velocity of the driver's vehicle.

27. A non-transitory computer-readable medium having stored thereon a computer program for a vehicle identification process to be executed by a signal processing circuit mounted in a vehicle,
   the vehicle including an independent multibeam antenna which outputs at least one reception signal in response to at least one arriving wave, and
   the signal processing circuit includes:
      a neural network circuit in which the learned neural network is implemented, and
      an arriving wave estimation circuit to estimate an angle or angles indicating a direction or directions of arrival of the at least one arriving wave and output a signal indicating a result of estimation; and
   the computer program causing the signal processing circuit to:
      receive the at least one reception signal from the independent multibeam antenna;
      input the at least one reception signal or a secondary signal generated from the at least one reception signal to the learned neural network;
      perform computation by using the at least one reception signal or secondary signal and data of the learned neural network; and
      output a signal indicating a number of the at least one arriving wave from the learned neural network.

* * * * *

UNITED STATES PATENT AND TRADEMARK OFFICE
CERTIFICATE OF CORRECTION

PATENT NO. : 10,365,350 B2
APPLICATION NO. : 15/008624
DATED : July 30, 2019
INVENTOR(S) : Hiroyuki Kamo et al.

It is certified that error appears in the above-identified patent and that said Letters Patent is hereby corrected as shown below:

On the Title Page

Item (73), Assignees, change "NATIONAL UNIVERSITY CORPORATION SHIZUOKA UNIVERSIT, Shizuoka (JP)" to --NATIONAL UNIVERSITY CORPORATION SHIZUOKA UNIVERSITY, Shizuoka (JP)--.

Signed and Sealed this
Eighteenth Day of August, 2020

Andrei Iancu
*Director of the United States Patent and Trademark Office*